US008105750B2

(12) United States Patent
Wada et al.

(10) Patent No.: US 8,105,750 B2
(45) Date of Patent: Jan. 31, 2012

(54) OPTICAL RECORDING MEDIUM AND METHOD OF MANUFACTURING THE SAME

(75) Inventors: Yutaka Wada, Miyagi (JP); Masatsugu Suwabe, Miyagi (JP); Toru Yano, Chiba (JP); Koichi Shigeno, Tokyo (JP)

(73) Assignees: Sony Corporation, Tokyo (JP); Adeka Corporation, Tokyo (JP)

( * ) Notice: Subject to any disclaimer, the term of this patent is extended or adjusted under 35 U.S.C. 154(b) by 652 days.

(21) Appl. No.: 11/909,781

(22) PCT Filed: Jan. 26, 2007

(86) PCT No.: PCT/JP2007/051277
§ 371 (c)(1),
(2), (4) Date: Nov. 5, 2007

(87) PCT Pub. No.: WO2007/086512
PCT Pub. Date: Aug. 2, 2007

(65) Prior Publication Data
US 2009/0148650 A1 Jun. 11, 2009

(30) Foreign Application Priority Data

Jan. 27, 2006 (JP) ................. P2006-019782

(51) Int. Cl.
*G11B 7/24* (2006.01)
(52) U.S. Cl. ............. 430/270.21; 430/945; 430/270.14; 428/64.8; 369/288; 369/284
(58) Field of Classification Search .................. None
See application file for complete search history.

(56) References Cited

U.S. PATENT DOCUMENTS 7,674,569 B2 * 3/2010 Yano et al. ............... 430/270.21
(Continued)

FOREIGN PATENT DOCUMENTS
EP 1653458 5/2006
(Continued)

OTHER PUBLICATIONS

International Search Report dated Mar. 7, 2007.

*Primary Examiner* — Martin Angebranndt
(74) *Attorney, Agent, or Firm* — K&L Gates LLP

(57) ABSTRACT

Recording and reproducing characteristics and data saving reliability are secured in a write-once two-layer recording medium.
A second recording layer from a side irradiated with light for recording and reproduction includes organic dye shown by a general formula of a chemical formula 3 described below (in the formula, R1 and R2 are alkyl groups of carbon number 1 to 4; Y1, Y2 respectively are organic groups independently; and X is $ClO_4$, $BF_4$, $PF_6$, $SbF_6$), and organic dye shown by a general formula of a chemical formula 4 described below (in the formula, R1, R4 are alkyl groups of carbon number 1 to 4; R2, R3 are alkyl groups of carbon number 1 to 4 or groups forming 3 to 6 membered rings by being coupled; Y1, Y2 respectively are organic groups independently; and X is $ClO_4$, $BF_4$, $PF_6$, $SbF_6$), to secure durability.

[chemical formula 3]

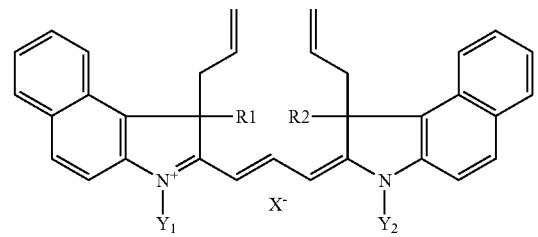

[chemical formula 4]

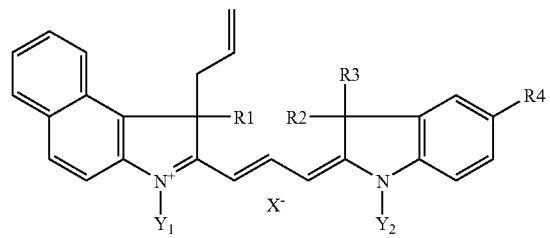

33 Claims, 12 Drawing Sheets

U.S. PATENT DOCUMENTS

| | | | |
|---|---|---|---|
| 7,709,181 B2 * | 5/2010 | Shigeno et al. | 430/270.21 |
| 8,029,976 B2 * | 10/2011 | Wada et al. | 430/270.21 |
| 2002/0178517 A1 * | 12/2002 | Kasada et al. | 8/644 |
| 2005/0031993 A1 * | 2/2005 | Yano et al. | 430/270.21 |
| 2005/0058801 A1 * | 3/2005 | Tsujita et al. | 428/64.4 |
| 2005/0094548 A1 * | 5/2005 | Wada et al. | 369/275.4 |
| 2006/0110566 A1 * | 5/2006 | Wada et al. | 428/64.1 |
| 2006/0141203 A1 * | 6/2006 | Monden et al. | 428/64.4 |
| 2006/0286483 A1 * | 12/2006 | Yano et al. | 430/270.21 |
| 2007/0065758 A1 * | 3/2007 | Martens et al. | 430/321 |
| 2007/0280092 A1 * | 12/2007 | Takazawa et al. | 369/275.1 |
| 2007/0283377 A1 * | 12/2007 | Nakamura et al. | 720/718 |
| 2008/0033179 A1 * | 2/2008 | Yano et al. | 546/277.4 |
| 2008/0138740 A1 * | 6/2008 | Okada et al. | 430/270.21 |
| 2009/0149660 A1 * | 6/2009 | Shinkai et al. | 548/427 |
| 2009/0226658 A1 * | 9/2009 | Monden et al. | 428/64.8 |

FOREIGN PATENT DOCUMENTS

| | | | |
|---|---|---|---|
| JP | 2003-231359 | | 8/2003 |
| JP | 2005-050497 | * | 2/2005 |
| JP | 2006-185551 | | 7/2006 |
| JP | 2007-090576 | * | 4/2007 |
| WO | 2005014722 | | 2/2005 |
| WO | 2006011306 | | 2/2006 |
| WO | 2007/037204 | * | 5/2007 |

* cited by examiner

OPTICAL RECORDING MEDIUM AND METHOD OF MANUFACTURING THE SAME

CROSS REFERENCE TO RELATED APPLICATIONS

The present application claims priority to Japanese Patent Document Nos. P2006-019782 filed on Jan. 27, 2006, the disclosure of which is herein incorporated by reference.

BACKGROUND

Technical Field

The present invention relates to an optical recording medium, particularly to an optical recording medium using organic dye for the recording layer, and to a method of manufacturing the same.

An optical recording medium using organic dye material for a recording layer (hereinafter, described as an organic dye optical recording medium) is a medium in which a recording layer having organic dye as a main component is provided on a transparent substrate made of plastic or the like, the surface of the recording layer is scanned with integrated laser light, and information is recorded with high density by forming pits only at portions of the surface irradiated, and CD-R (write-once CD: Compact Disc®), DVR-R and DVD+R (write-once DVD: Digital Versatile Disc®) and the like have come into practical use. The organic dye optical recording media are simple in structure and manufactured inexpensively, so that they are widely accepted in the market for backup of data, pictures and the like and for music usage.

Unexamined Patent Application Publication No. 2002-52829 and Unexamined Patent Application publication No. 2003-231359 published by the Japanese Patent Office disclose various kinds of dye materials preferable for being applied to DVR-R and the like.

However, along with rapid progress of computer in recent years, higher-capacity recording media have been desired and optical recording media having correspondence with two-layer recording in which the recording layer has a two-layer structure have been on sale for DVR-R and DVD+R.

Recording of information to an organic dye optical recording medium is carried out in a heat mode. By irradiating a recording layer with laser light, the organic dye in the portion irradiated is resolved with the heat by absorbing the laser light. The portion in which the organic dye is resolved has different reflectivity from that of un-resolved portions, so that pits are formed in the recording layer. Accordingly, in the organic dye optical recording medium, the mechanism for absorbing heat becomes important. Necessary amount of heat in order to resolve the organic dye in the recording layer is determined by amount of laser light and light absorption spectrum. For the organic dye optical recording medium, the balance between them determines reflectivity and recording sensitivity of the recording layer.

In the optical recording medium as mentioned above in which the recording layer has a two-layer structure, data is recorded in the second recording layer passing through the first recording layer, so that it is necessary to develop a material of high sensitivity and high reflectivity such that both of the first recording layer and the second recording layer can be recorded favorably by the same laser light source while approximately 50% permeability of the first recording layer is secured.

Further, an optically-transparent material layer, called a spacer layer, is stacked through a thin semi-transmissive reflective film on the first recording layer and, the second recording layer is directly stacked on this spacer layer, so that securing the saving reliability is highly important in the optical recording medium in which the recording layer has a two-layer structure.

SUMMARY

In view of the above problems, the present invention has an object to secure favorable recording and reproducing characteristics and reliability in saving recorded information in an optical recording medium in which organic dye is used for a recording layer, in particular, in an optical recording medium in which the recording layer has a two-layer structure.

A first invention is an optical recording medium including at least a first recording layer, a semi-transmissive reflective layer, an optically-transparent material layer, a second recording layer and a reflective layer formed on an optically-transparent substrate in which the first and second recording layer includes organic dye, in which the first recording layer includes organic dye shown by a general formula expressed at least by a chemical formula 1 mentioned below (in the formula, R1 is an alkyl group of carbon number 1 to 4; R2, R3 respectively are alkyl groups of carbon number 1 to 4, benzyl groups or groups forming 3 to 6 membered rings by being coupled; Y1, Y2 respectively are organic groups independently; and X is $ClO_4$, $BF_4$, $PF_6$, $SbF_6$) and organic dye shown by a general formula expressed at least by a chemical formula 2 mentioned below (in the formula, R1, R4 are alkyl groups of carbon number 1 to 4; R2, R3 respectively are alkyl groups of carbon number 1 to 4, benzyl groups or groups forming 3 to 6 membered rings by being coupled; Y1, Y2 respectively are organic groups independently; and X is $ClO_4$, $BF_4$, $PF_6$, $SbF_6$), or the first recording layer includes organic dye shown by a general formula expressed at least by a chemical formula 3 mentioned below (in the formula, R1 and R2 are alkyl groups of carbon number 1 to 4; Y1, Y2 respectively are organic groups independently; and X is $ClO_4$, $BF_4$, $PF_6$, $SbF_6$) and organic dye shown by a general formula expressed at least by a chemical formula 4 mentioned below (in the formula, R1, R4 are alkyl groups of carbon number 1 to 4; R2, R3 are alkyl groups of carbon number 1 to 4 or groups forming 3 to 6 membered rings by being coupled; Y1, Y2 respectively are organic groups independently; and X is $ClO_4$, $BF_4$, $PF_6$, $SbF_6$), and the second recording layer includes organic dye shown by a general formula expressed at least by a chemical formula 3 mentioned below and organic dye shown by a general formula expressed at least by a chemical formula 4 mentioned below.

[chemical formula 1]

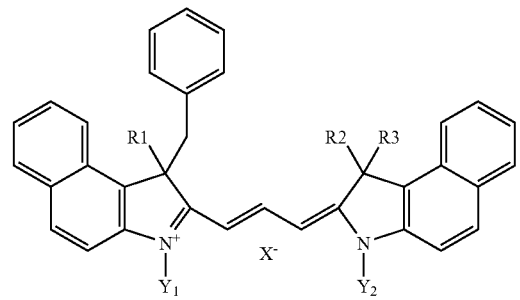

-continued

[chemical formula 2]

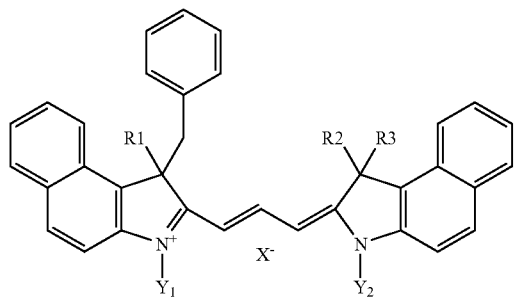

[chemical formula 3]

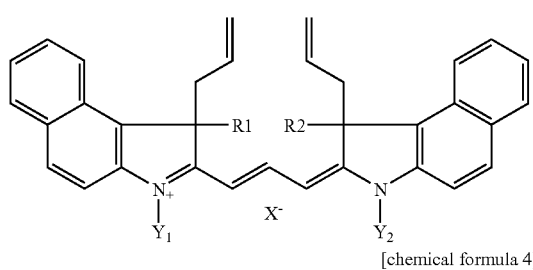

[chemical formula 4]

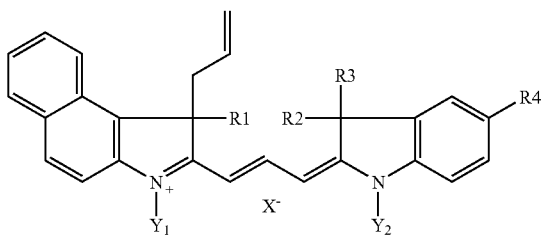

A second invention is an optical recording medium including at least one recording layer which includes organic dye, in which the recording layer includes organic dye shown by a general formula expressed at least by the chemical formula 3, and organic dye shown by a general formula expressed at least by the chemical formula 4.

A third invention is a method of manufacturing an optical recording medium according to what is called a 2P (Photo-Polymerization) method including the steps of: stacking at least a first recording layer and a semi-transmissive reflective layer formed on an optically-transparent substrate with a groove, depositing a light curing material layer on the semi-transmissive reflective layer, irradiating the light curing material layer with light and hardening the light curing material layer in a state in which a stamper formed with a groove pattern is depressed, to form an optically-transparent material layer, exfoliating the stamper from the optically-transparent material layer and stacking and forming at least a second recording layer and a reflective layer, in which the first recording layer uses a material having organic dye shown by a general formula expressed at least by the chemical formula 1 and organic dye shown by a general formula expressed at least by the chemical formula 2, or the first recording layer uses a material having organic dye shown by a general formula expressed at least by the chemical formula 3 and organic dye shown by a general formula expressed at least by the chemical formula 4. Further, the second recording layer uses a material having organic dye shown by a general formula expressed at least by the chemical formula 3 and with organic dye shown by a general formula expressed at least by the chemical formula 4.

A fourth invention is a method of manufacturing an optical recording medium according to what is called an inverted stack method including the steps of: stacking at least a first recording layer and a semi-transmissive reflective layer formed on an optically-transparent first substrate with a groove, stacking at least a reflective layer and a second recording layer formed on a second substrate with a groove having reverse polarity to the groove of the first substrate, and joining the semi-transmissive reflective layer side on the first substrate and the second recording layer side on the second substrate with an optically-transparent material portion in between, in which the first recording layer uses a material having organic dye shown by a general formula expressed at least by the chemical formula 1 and organic dye shown by a general formula expressed at least by the chemical formula 2, or the first recording layer uses a material having organic dye shown by a general formula expressed at least by the chemical formula 3 and organic dye shown by a general formula expressed by the chemical formula 4; and the second recording layer uses a material having organic dye shown by a general formula expressed at least by the chemical formula 3 and with organic dye shown by a general formula expressed at least by the chemical formula 4.

As mentioned above, in the optical recording medium and the method of manufacturing the same according to the present invention, the first recording layer is made to have a structure which includes organic dye shown in general formulas expressed by the chemical formula 1 and chemical formula 2, or organic dye shown in general formulas expressed by the chemical formula 3 and chemical formula 4, and the second recording layer is made to have a structure which includes organic dye shown in general formulas expressed by the chemical formula 3 and chemical formula 4.

By employing such structure, it is possible to carry out recording to the first recording layer with favorable recording and reproducing characteristics and, it is possible to obtain favorable recording and reproducing characteristics of the second recording layer, also to secure durability of the first and second recording layers, and in particular to improve durability of the second recording layer greatly as compared with that in the past.

More specifically, in an optical recording medium in which the recording layer manufactured by a 2P method and an inverted stack method has a two-layer structure, it is possible to secure favorable recording and reproducing characteristics and reliability in saving the recorded information with respect to both the first and second recording layers.

Also, in an optical recording medium including at least one recording layer including organic dye, the recording layer uses a material which includes organic dye shown in general formulas expressed by the chemical formula 3 and chemical formula 4, so that it is possible to secure favorable recording and reproducing characteristics and reliability in saving recorded information.

According to the optical recording medium and the method of manufacturing the same of the present invention, in an optical recording medium in which organic dye is used for a recording layer, it is possible to secure favorable recording and reproducing characteristics and reliability in saving recorded information.

In particular, in an optical recording medium in which the recording layer has a two-layer structure, it is possible to secure favorable recording and reproducing characteristics and reliability in saving recorded information in the second recording layer by forming the second recording layer using a material including organic dye shown by general formulas expressed by the chemical formula 3 and chemical formula 4.

Additional features and advantages of the present invention are described in, and will be apparent from, the following Detailed Description and the Figures.

DETAILED DESCRIPTION

Hereinafter, embodiments to carry out the present invention will be explained, but the present invention is not limited thereto.

The present invention relates to an optical recording medium, for example, of a disc type which includes a recording layer including organic dye and in particular, proposes an optical recording medium capable of being used with DVR-R and DVD+R having a single recording layer, capable of high speed recording in DVR-R DL and DVD+R DL formed by a 2P method or an inverted stack method (write-once DVD® having a two-layer structure for a recording layer) which will be mentioned later, and having high data saving reliability.

First, embodiments in which the present invention is applied to an optical recording medium manufactured by the 2P method will be explained.

Figure 1:
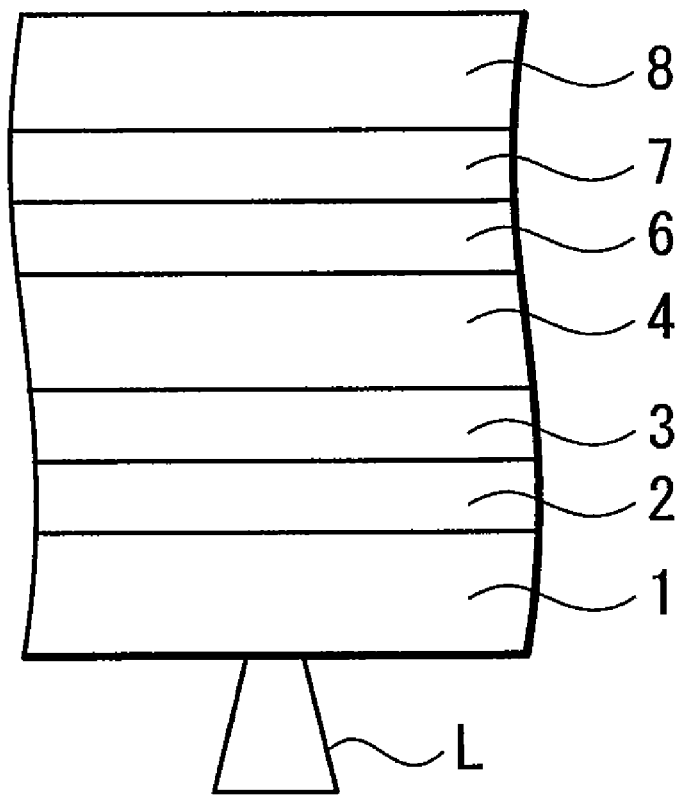
FIG. 1 is a schematic cross-sectional diagram of an optical recording medium according to an embodiment of the present invention.

FIG. 1 shows a schematic cross-sectional diagram of an embodiment in which the present invention is applied to an optical recording medium manufacture by a 2P method. In this example, there are stacked, on an optically-transparent substrate 1 including PC (polycarbonate) or the like, at least a first recording layer 2 including organic dye, a semi-transmissive reflective layer 3 formed of a silver alloy or the like, an optically-transparent material layer 4 formed of UV (ultraviolet) curing resin or the like, a second recording layer 6 including organic dye, and a reflective layer 7 formed of a silver alloy or the like. In this case, a protective layer 8 is provided on the reflective layer 7. Such optical recording medium is irradiated with light L for recording or reproduction from the substrate 1 side and recording or reproduction is carried out.

Here, in this optical recording medium, the optically-transparent material layer 4 only needs to be a material transmitting light in the range of wavelength for the recording and reproduction with necessary permeability and, for example, it is allowed to employ a structure in which a dielectric layer and a UV curing resin are stacked. Consequently, it is allowed to employ a structure in which a dielectric layer having optical-transparency in a necessary range of wavelength is made to intervene between the semi-transmissive reflective layer 3 and the optically-transparent material layer 4 and/or between the optically-transparent material layer 4 and the second recording layer. In the case of making the dielectric layer intervene between the recording layer and the optically-transparent material layer in this manner, it is possible to suppress influence on the recording layer by the optically-transparent material layer and to improve durability.

An embodiment of a method of manufacturing the optical recording medium will be explained with reference to manufacturing process diagrams of FIGS. 2A to 2C and FIGS. 3A and 3B.

Figure 2A:
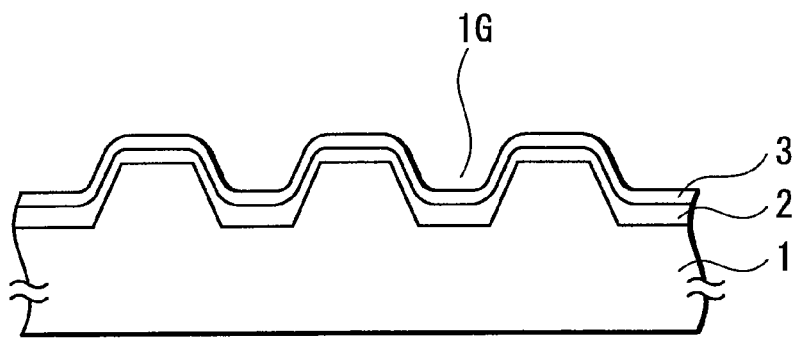
FIGS. 2A to 2C are schematic manufacturing process diagrams of a method of manufacturing an optical recording medium according to an embodiment of the present invention.

As shown in FIG. 2A, first, an optically-transparent substrate 1 having grooves 1G with a predetermined track pitch and depth and formed of PC or the like is prepared. This substrate 1 is manufactured, for example, by injection molding or the like. Then, the first recording layer 2 is coated thereon by a spin-coat method or the like and further, the semi-transparent reflective layer 3 is stacked by a sputtering method.

Figure 2B:
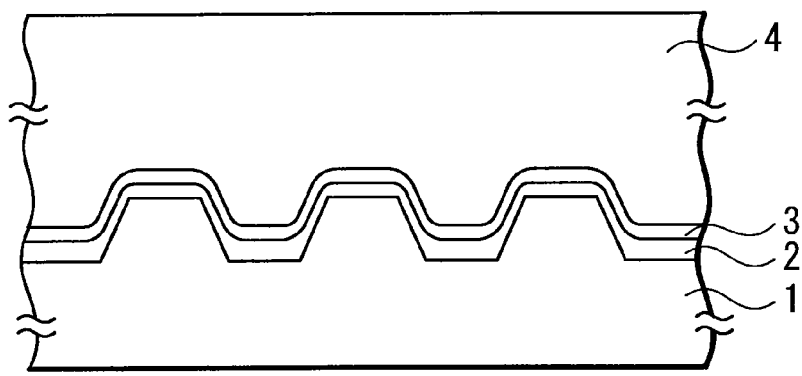
Figure 2C:
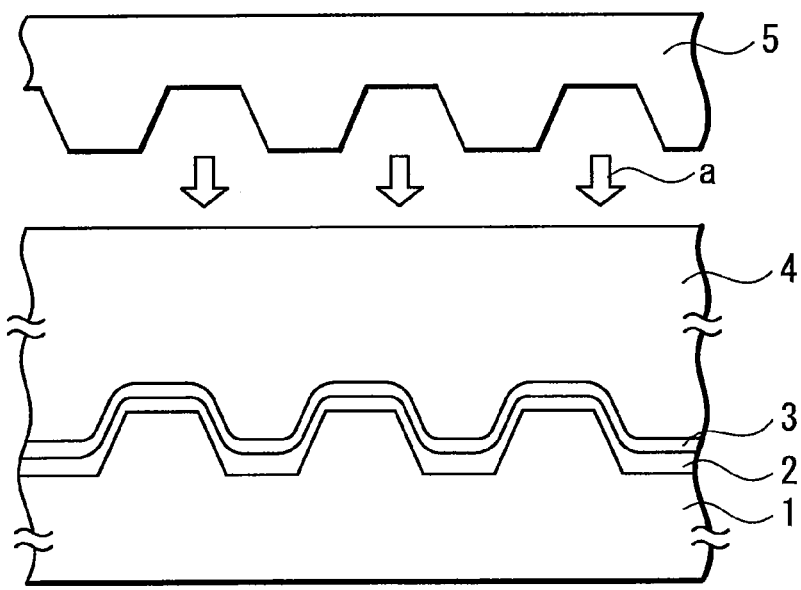

Then, as shown in FIG. 2B, the optically-transparent material layer 4 of the UV curing resin or the like is coated on the semi-transparent reflective layer 3 by a spin-coat method or the like. Then, as shown in FIG. 2C, a stamper having a reverse polarity to that of the grooves 1G formed on the substrate 1, that is, being formed by reversing concavity and convexity is pressed onto the optically-transparent material layer 4 on the substrate 1 as shown by arrow a. In this state, that is, in the state shown in FIG. 3A, the optically-transparent material layer 4 is irradiated with, for example, ultraviolet to be hardened. In this manner, grooves 4G having a predetermined track pitch and depth are formed on the optically-transparent material layer 4, or a spacer layer.

Figure 3A:
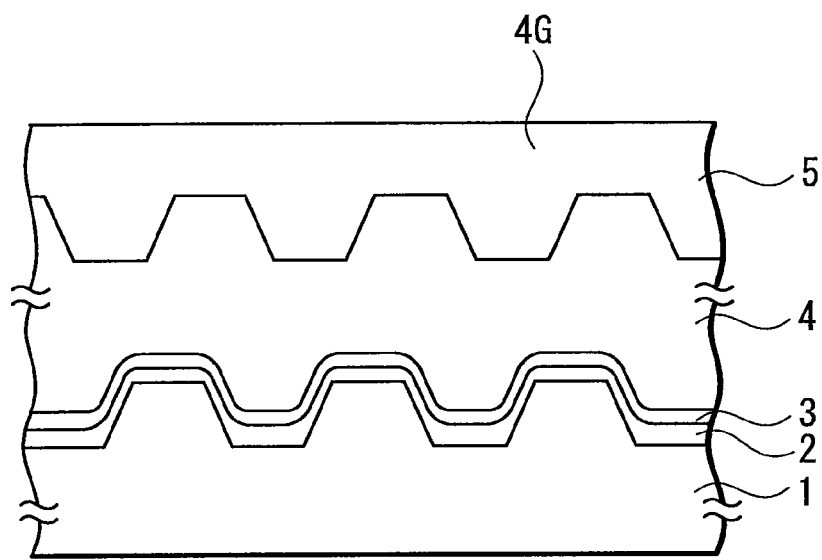
FIGS. 3A and 3B show one manufacturing process diagram of a method of manufacturing an optical recording medium according to an embodiment of the present invention.
Figure 3B:
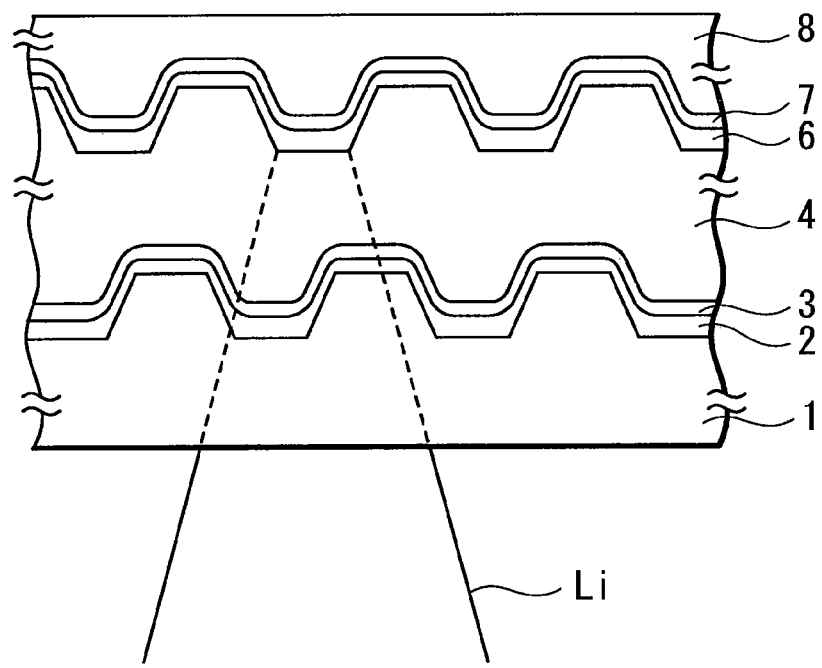

Thereafter, the stamper 5 is exfoliated and as shown in FIG. 3B, the second recording layer 6 is coated by a spin-coat method or the like and further, the reflective layer 7 is formed by a sputtering method, the protective layer 8 is formed thereon by depositing an optically-transparent substrate through a UV curing resin or the like or by a similar manner, and an optical recording medium manufactured by a 2P method is obtained.

Next, a result of studying characteristics of an optical recording medium having a structure according to the present invention manufactured by such manufacturing method will be explained.

In the example below, a substrate formed of PC having the thickness of 0.575 mm was prepared as the substrate 1, the first recording layer 2 of a later-described material was formed thereon, and the semi-transparent reflective layer 3 of a silver alloy was stacked thereon by a sputtering method. Next, a UV curing resin in order to form an optically-transparent material layer, or a spacer layer was coated by 50 μm using a spin-coat method; the stamper 5 formed of Zeonor manufactured by ZEON Corporation in which grooves of reverse polarity to the grooves 1G of the substrate 1 are formed beforehand was pressed; the UV curing resin was irradiated with UV to be hardened; and the optically-transparent material layer 4 was made. Thereafter, this stamper was exfoliated and the grooves 4G for the second recording layer were formed at the optically-transparent material layer 4. Further, thereafter, the second recording layer 6 formed of a later-material mentioned was formed by a spin-coat method and the silver reflective film 7 was stacked thereon by a sputtering method. Then, similarly to a typical optical recording medium having a single layer, a transparent substrate having the thickness of 0.6 mm is bonded to form the protective layer 8 through the UV curing resin, and an optical recording medium having a structure of the present invention was fabricated.

Figure 4:
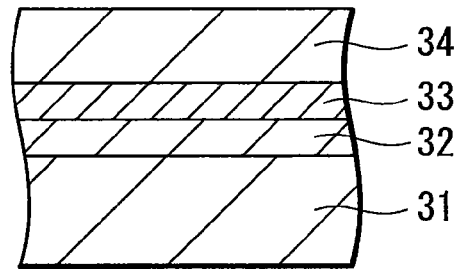
FIG. 4 is a schematic cross-sectional diagram of a main portion of an optical recording medium according to an embodiment of the present invention.

Also, as shown in the schematic cross-sectional diagram of FIG. 4, an optical recording medium of a single layer structure was also fabricated, in which a recording layer 32 including organic dye, a reflective layer 33 and a protective layer 34 were formed on the substrate 31.

The liquid made by dissolving organic dye into tetrafluoropropanol (TFP) which is coating solvent was used for the coating liquid used in the coating process for the first and the second recording layers 2 and 6 in the optical recording medium having a two-layer structure of the recording layer and for the recording layer 32 in the optical recording medium having a single layer structure mentioned above. As organic dye used for the material of the recording layer, dye of a structural formula expressed by a chemical formula 5 mentioned below was used as one example having the general formula expressed by the chemical formula 1, dye of a structural formula expressed by a chemical formula 6 mentioned below was used as one example having the general formula expressed by the chemical formula 2, dye of a structural formula expressed by a chemical formula 7 mentioned below was used as one example having the general formula expressed by the chemical formula 3, and further, dye of a structural formula expressed by a chemical formula 8 mentioned below was used as one example having the general formula expressed by the chemical formula 4, respectively. Also, IRG022 (brand name) manufactured by Nippon Kayaku Co., Ltd. was used as one example of inactivator, and as phthalocyanine dye, Ultra Green MX (brand name) manufactured by Ciba Specialty Chemicals K.K. which is widely used in CD-R recording films for high speed recording was used as one example.

[chemical formula 5]

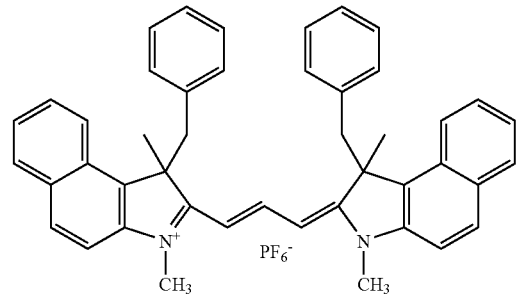

[chemical formula 6]

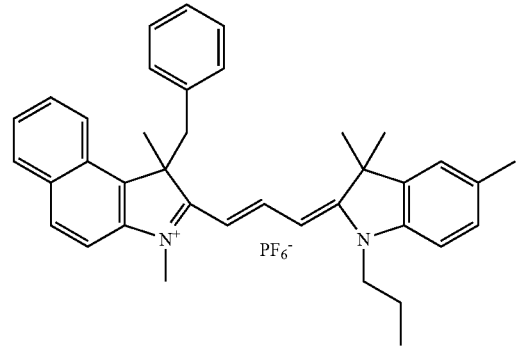

[chemical formula 7]

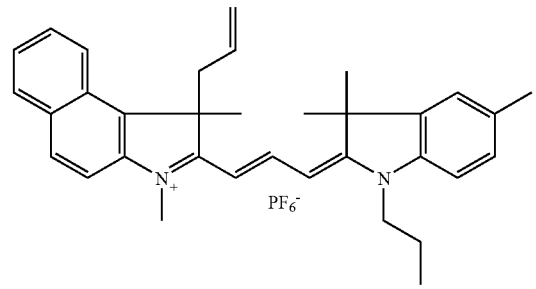

-continued

[chemical formula 8]

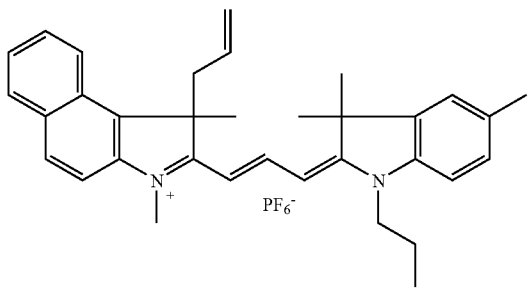

Figure 5:
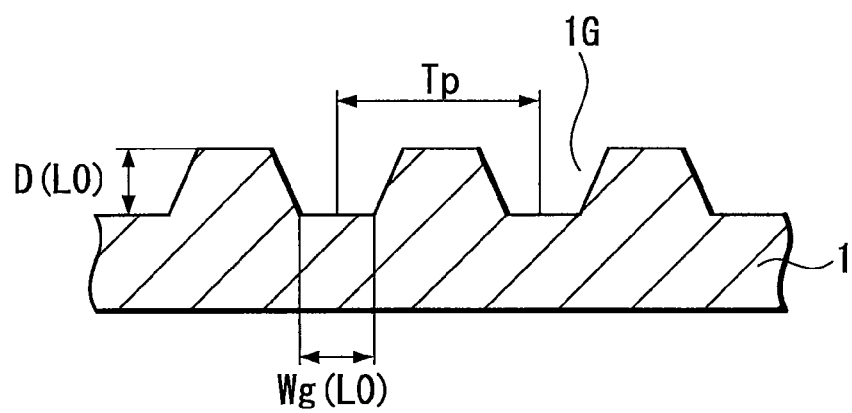
FIG. 5 is a schematic cross-sectional diagram of a main portion of an optical recording medium according to an embodiment of the present invention.
Figure 6:
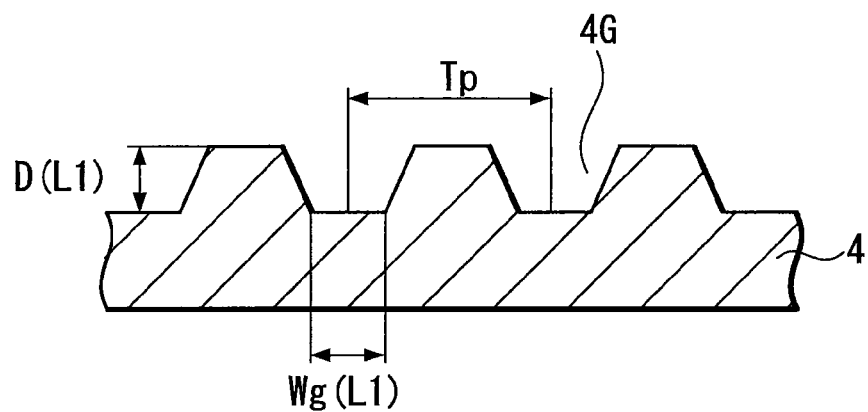
FIG. 6 is a schematic cross-sectional diagram of a main portion of an optical recording medium according to an embodiment of the present invention.

Further, optical density (Optical Density) for respective recording layers is defined as OD=−log(T), where T is permeability in the maximum wavelength λmax of absorption, and both were 0.50. The used substrates 1 and 31 have a shape shown in the schematic cross-sectional diagram of FIG. 5 and, for example, track pitch Tp was 0.74 μm, and groove depth D(L0) and width Wg(L0) of the groove were respectively 160 nm, 220 nm. It should be noted that the groove width Wg(L0) of the groove is defined as width of the base of the groove portion whose side surface is inclined. Also, the groove 4G for the second recording layer 6, which is formed on the optically-transparent material layer 4 in the optical recording medium having a two-layer type structure of the recording layer has a shape shown in the schematic cross-sectional diagram of FIG. 6 and, for example, track pitch T p was 0.74 μm, and groove depth D(L1) and width Wg(L1) of the groove 4G were respectively 160 nm, 220 nm. In this case, similarly, the groove width Wg(L1) of the groove 4G is defined as width of the base of the groove portion whose side surface is inclined.

ODU-1000 (brand name) manufactured by Pulstec Industrial Co., Ltd. was used for signal recording and reproduction. Laser light wavelength of this evaluation machine is 650 nm, numerical aperture NA of the focusing lens is 0.65, and jitter value of the reproduction signal was measured by recording EFM plus signals used in DVD at random. The recording condition is 2.4× speed recording (linear velocity: 8.4 m/s for a single recording layer, 9.2 m/s for two recording layers) using Pulse Strategy based on the recording system standard of DVD+R (single recording layer) and DVD+R DL (two recording layers) and is 8× speed (linear velocity: 27.9 m/s for a single recording layer, 30.7 m/s for two recording layers) using Castle Strategy, and jitter value for recording power was measured when reproduction was carried out at 1× speed (linear velocity: 3.5 m/s for a single recording layer, 3.8 m/s for two recording layers). The recording onto the second recording layer of the optical recording medium of the two-layer type was carried out after the recording onto the first recording layer.

The jitter value shows fluctuation of recorded marks and spaces in the time axis upon reproduction, so that it becomes an index showing accuracy of the recorded mark and the space, and it means that the smaller the jitter value is, the higher the signal quality is. In the following Table 1 and Table 2, there are shown jitter values in the optimum recording power when recording data at 2.4× speed and at 8× speed respectively.

Further, in Table 1 mentioned below, W1 is the weight of the organic dye expressed by the chemical formula 1, that is, the organic dye expressed by the chemical formula 5 in this example; W2 is the weight of the organic dye expressed by the chemical formula 2, that is, the organic dye expressed by the chemical formula 6 in this example; W3 is the weight of the organic dye expressed by the chemical formula 3, that is, the organic dye expressed by the chemical formula 7 in this example; W4 is the weight of the organic dye expressed by the chemical formula 4, that is, the organic dye expressed by the chemical formula 8 in this example; W5 is the weight of the inactivator, and W6 is the weight of the phthalocyanine dye, and fabrication was carried out under the condition that weight ratios of respective materials in each recording layer were made as mentioned below.

First, a recording layer in the optical recording medium having the single recording layer was formed by selecting the weight ratio W4/(W3+W4) of the weights W3, W4 of the organic dyes expressed by the chemical formula 7 and chemical formula 8, also the weight ratio W5/(W3+W4+W5) of the weight W5 of the inactivator and further, the weight ratio W6/(W3+W4+W5+W6) of the weight W6 of the phthalocyanine dye to be as follows:

$W4/(W3+W4)=0.6$ $W5/(W3+W4+W5)=0.12$ $W6/(W3+W4+W5+W6)=0.03$

Also, optical recording media having the following two kinds of material structures were fabricated for the optical recording medium having two recording layers. These are shown as an optical recording medium (1) and an optical recording medium (2).

In the optical recording medium (1), the first recording layer (1) was formed by selecting the weight ratio W2/(W1+W2) of the weights W1, W2 of the organic dyes expressed by the chemical formula 5 and chemical formula 6, also the weight ratio W5/(W3+W4+W5) of the weight W5 of the inactivator and further, the weight ratio W6/(W3+W4+W5+W6) of the weight W6 of the phthalocyanine dye to be as follows:

$W2/(W1+W2)=0.6$ $W5/(W1+W2+W5)=0.12$ $W6/(W1+W2+W5+W6)=0.03$

Also, the first recording layer (2) of the optical recording medium (2) was formed by selecting the weight ratio W4/(W3+W4) of the weights W3, W4 of the organic dyes expressed by the chemical formula 7 and chemical formula 8, also the weight ratio W5/(W3+W4+W5) of the weight W5 of the inactivator and further, the weight ratio W6/(W3+W4+W5+W6) of the weight W6 of the phthalocyanine dye to be as follows:

$W4/(W3+W4)=0.4$ $W5/(W3+W4+W5)=0.12$ $W6/(W3+W4+W5+W6)=0.03$

On the other hand, the second recording layer (1) of the optical recording medium (1) was formed by selecting the weight ratio W2/(W1+W2) of the weights W1, W2 of the organic dyes expressed by the chemical formula 5 and chemical formula 6, also the weight ratio W5/(W3+W4+W5) of the weight W5 of the inactivator and further, the weight ratio W6/(W3+W4+W5+W6) of the weight W6 of the phthalocyanine dye to be as follows:

$W2/(W1+W2)=0.4$ $W5/(W1+W2+W5)=0.12$ $W6/(W1+W2+W5+W6)=0.03$

Further, the second recording layer (2) of the optical recording medium (2) was formed by selecting the weight ratio W4/(W3+W4) of the weights W3, W4 of the organic dyes expressed by the chemical formula 7 and chemical formula 8, also the weight ratio W5/(W3+W4+W5) of the weight W5 of the inactivator and further, the weight ratio W6/(W3+W4+W5+W6) of the weight W6 of the phthalocyanine dye to be as follows:

$$W4/(W3+W4)=0.2$$

$$W5/(W3+W4+W5)=0.12$$

$$W6/(W3+W4+W5+W6)=0.03$$

Jitter values in respective recording layers of each optical recording medium fabricated using the above material structures are shown in Table 1 and Table 2 mentioned below.

TABLE 1

| | (x2.4 Speed) | | | |
|---|---|---|---|---|
| | Single layer | First Recording Layer (1) | First Recording Layer (2) | Second Recording Layer (1) | Second Recording Layer (2) |
| Jitter [%] | 6.1 | 6.0 | 6.0 | 6.0 | 5.2 |

TABLE 2

| | (x8 Speed) | | | |
|---|---|---|---|---|
| | Single layer | First Recording Layer (1) | First Recording Layer (2) | Second Recording Layer (1) | Second Recording Layer (2) |
| Jitter [%] | 6.5 | 6.5 | 6.4 | 6.2 | 6.1 |

According to the standard of DVD+R and DVD+R DL, the upper limit value of jitter in the optimum recording power is 9% and therefore, it is understood that all the combinations have favorable jitter characteristics as single-layer and two-layer write-once DVD media from recording at low speed to recording at high speed.

Figure 7:
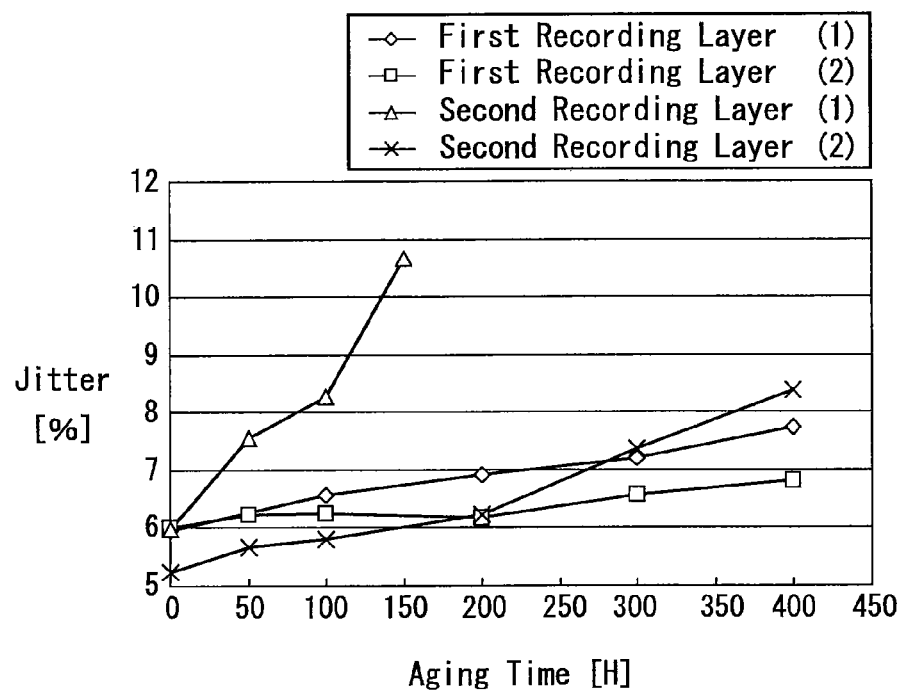
FIG. 7 is a diagram showing a result obtained by studying durability of an optical recording medium according to an embodiment and a comparison example of the present invention.

Next, FIG. 7 shows a result of an acceleration test carried out in order to confirm reliability in saving recorded information. Temperature was 70° C. and humidity was 85% for the testing condition; a composite film in which phthalocyanine dye and inactivator were added to the organic dyes shown in the structural formulas expressed respectively by the chemical formula 5 and the chemical formula 6, and a composite film in which phthalocyanine dye and inactivator were added to the organic dyes shown in the structural formulas expressed by the chemical formula 7 and the chemical formula 8 were fabricated for the first recording layer and second recording layer, respectively; and durability tests were carried out respectively. As a result thereof, it was confirmed that the second recording layer including the materials shown in the structural formulas expressed by the chemical formula 5 and chemical formula 6 was deteriorated such that the jitter was beyond 12% in 150 hours but others than that kept favorable jitter until 400 hours. Consequently, it can be understood that it is possible for the first recording layer to use materials including organic dyes shown in the general formulas expressed by the chemical formula 1 and the chemical formula 2 or to use materials including organic dyes shown in the general formulas expressed by the chemical formula 3 and the chemical formula 4 and it is possible to obtain an optical recording medium which is excellent in reliability in saving the recorded information by forming the second recording layer including organic dyes shown in the general formulas expressed by the chemical formula 3 and the chemical formula 4.

Further, when a similar durability test was carried out by fabricating an optical recording medium having a single recording layer including the organic dyes shown in the general formulas expressed by the chemical formula 3 and chemical formula 4, it was possible to similarly obtain durability of 400 hours or more. Accordingly, the optical recording medium having a single recording layer, which has excellent durability and favorable recording and reproducing characteristics, can be obtained by using, for the recording layer, materials including the organic dyes shown in the general formulas expressed by the chemical formula 3 and chemical formula 4.

Figure 8:
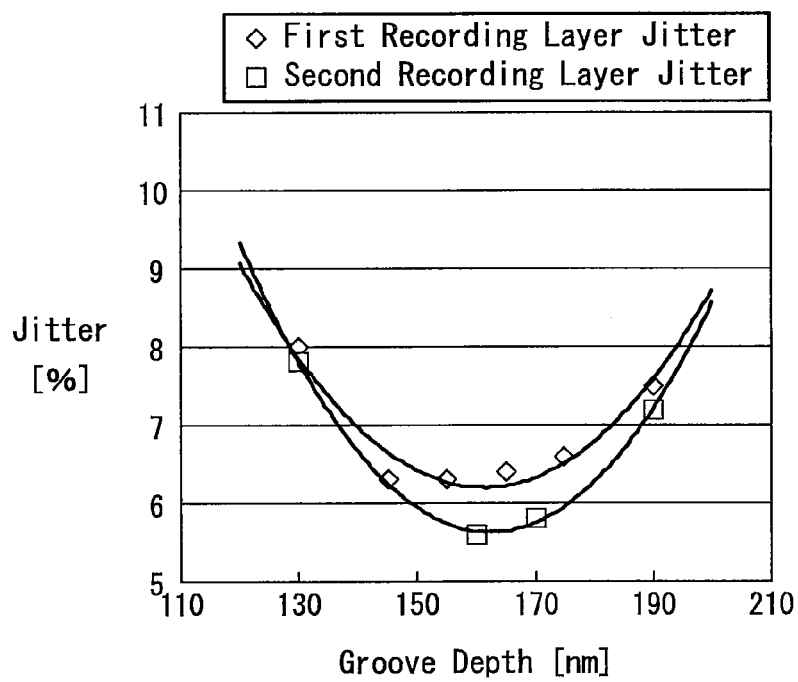
FIG. 8 is a diagram showing a relationship between groove depth and jitter of an optical recording medium according to an embodiment of the present invention.

Next, FIG. 8 shows a result of studying the groove widths $D(L0)$ and $D(L1)$ of the first and second recording layers in the optical recording medium having two recording layers. By using the optical recording medium in which each recording layer is formed based on the weight ratios similar to the compositions of the first recording layer (1) and the second recording layer (1) of the optical recording medium (1), jitter bottom values were measured on recording at 2.4× speed in a region in which groove depths $D(L0)$, $D(L1)$ of the grooves satisfy 130 nm$\leq D(L0)$, $D(L1)\leq 190$ nm respectively. As a result thereof, as being clear from FIG. 8, it can be understood that the jitter values are well below 9% for both the first recording layer and the second recording layer in the range of 130 nm$\leq D\leq 190$ nm. Consequently, it can be understood that the groove depths with which the signal characteristics become favorable are expressed as follows:

$$130 \text{ nm}\leq D(L0)\leq 190 \text{ nm}$$

$$130 \text{ nm}\leq D(L1)\leq 190 \text{ nm}$$

In this case, jitter 8% or less can be accomplished.

Further, it is desirable to select the ranges as follows in order to suppress the jitter around 7%:

$$140 \text{ nm}\leq D(L0)\leq 180 \text{ nm}$$

$$140 \text{ nm}\leq D(L1)\leq 180 \text{ nm}$$

Figure 9:
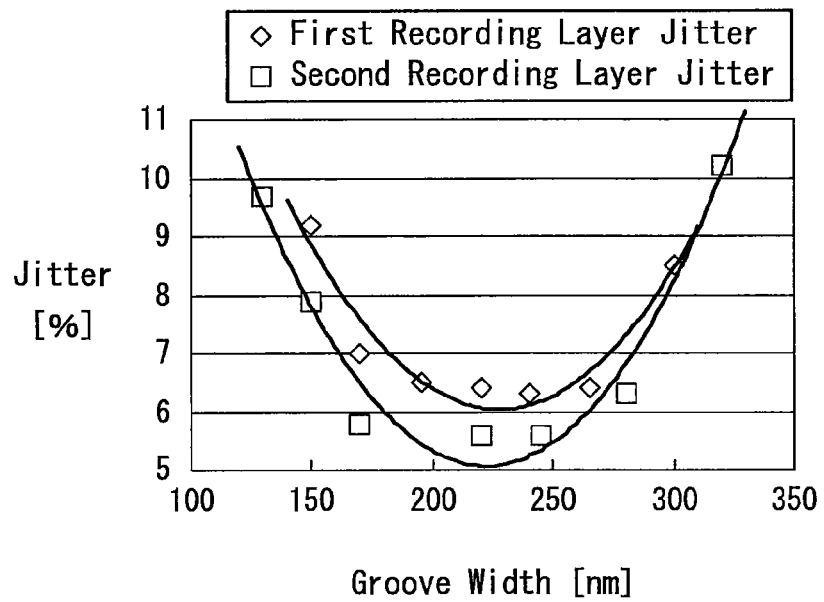
FIG. 9 is a diagram showing a relationship between groove width and jitter of an optical recording medium according to an embodiment of the present invention.

In addition, a study was carrying out also with respect to the groove width Wg. By using recording layers having the compositions similar to the first recording layer and the second recording layer of the optical recording medium (1) and by making the groove depths $D(L0)$ and $D(L1)$ of the grooves of the first and second recording layers to be $D(L0)=160$ nm, $D(L1)=160$ nm respectively, studies of the groove widths $Wg(L0)$, $Wg(L1)$ were carried out, respectively. FIG. 9 shows a result of plotting jitter values under the recording condition at 2.4× recording speed and with the optimum recording power for respective widths. It can be understood from FIG. 9 that the conditions of the groove widths $Wg(L0)$, $Wg(L1)$ with which the jitters below 9% can be obtained are as follows:

$$160 \text{ nm}\leq Wg(L0)\leq 300 \text{ nm}$$

$$140 \text{ nm}\leq Wg(L1)\leq 300 \text{ nm}$$

Further, it is desirable to select the ranges as follows in order to make the jitter to be 8% or less:

$$170 \text{ nm}\leq Wg(L0)\leq 290 \text{ nm}$$

$$150 \text{ nm}\leq Wg(L1)\leq 290 \text{ nm}$$

and in order to make the jitter to be 7% or less, it is desirable to select the ranges as follows:

$$180 \text{ nm}\leq Wg(L0)\leq 270 \text{ nm}$$

$$170 \text{ nm}\leq Wg(L1)\leq 280 \text{ nm}$$

Figure 10:
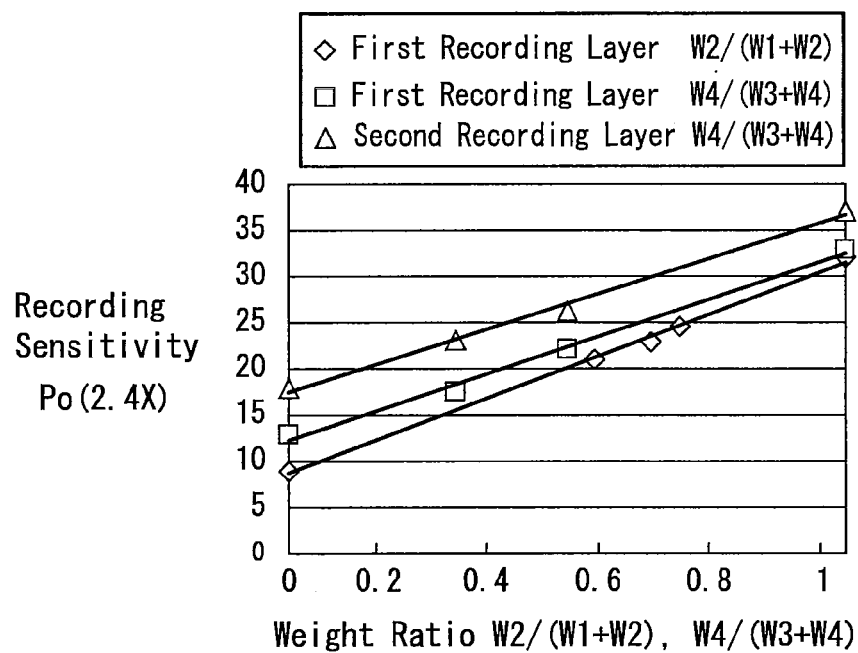
FIG. 10 is a diagram showing a relationship between weight ratio and recording sensitivity of a recording layer material of an optical recording medium according to an embodiment of the present invention.

Next, studies were carried out with respect to optimum ranges of compounding ratios of the organic dyes of the first recording layer and the second recording layer, respectively. The groove depths of the grooves were made to be D(L0)=160 nm for the first recording layer and D(L1)=160 nm for the second recording layer, respectively and, the groove widths of the grooves were made to be Wg(L0)=220 nm for the first recording layer and Wg(L1)=220 nm for the second recording layer. First, studies were carried out regarding compounding ratio of the weights W1 and W2 of the organic dyes shown in the general formulas expressed by the chemical formula 1 and chemical formula 2 and regarding compounding ratio of the weights W3 and W4 of the organic dyes shown in the general formulas expressed by the chemical formula 3 and chemical formula 4. These compounding ratios depend mainly on recording sensitivity, so that recording sensitivity Po(2.4×) upon recording at 2.4× speed for compounding ratio was evaluated. FIG. 10 shows the result.

The recording sensitivity changes depending on the compounding ratio of the organic dye expressed by the chemical formula 1 to chemical formula 4, in which there is a fear that data may be deteriorated by the reproduction power with excessively high sensitivity. Consequently, it is desirable for the lower limit of the recording sensitivity to be 20 mW or more. Further, the upper limit of the recording sensitivity is 30 mW according to DVD+R DL standard, so that a preferable range of the recording sensitivity becomes as follows:

$$20 \text{ mW} \leq Po(2.4\times) \leq 30 \text{ mW}$$

It can be understood from FIG. 10 that the compounding ratios satisfying this condition in the first recording layer are as follows:

$$0.5 \leq W2/(W1+W2) \leq 0.9$$

$$0.4 \leq W4/(W3+W4) \leq 0.8$$

Also, it can be understood in the second recording layer that the compounding ratio satisfying the condition is as follows:

$$0.1 \leq W4/(W3+W4) \leq 0.5$$

Figure 11:
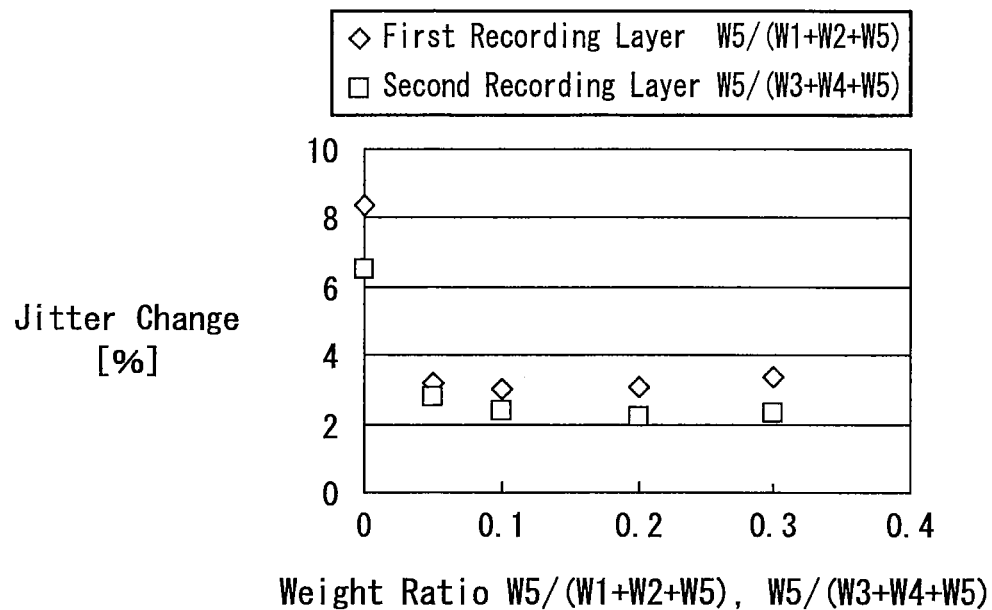
FIG. 11 is a diagram showing a relationship between weight ratio of an inactivator and jitter change in a recording layer of an optical recording medium according to an embodiment of the present invention.

Next, a result of studying the weight ratio of the inactivator out will be explained. Generally, cyanine dye is not sufficient in light resistance, but it is possible to overcome that by adding inactivator to the recording layer. FIG. 11 shows an amount of jitter change before and after a light resistance test when IRG022 manufactured by Nippon Kayaku Co., Ltd. was used as inactivator. At that time, the first recording layer was made of a material including organic dyes shown in general formulas expressed by the chemical formula 1 and chemical formula 2 (weight of each organic dye is W1, W2), the second recording layer was made of a material including organic dyes shown in general formulas expressed by the chemical formula 3 and chemical formula 4 (weight of each organic dye is W3, W4), and the composition ratios were W2/(W1+W2)=0.6, W4/(W3+W4)=0.4 respectively. Light resistance testing was carried out under the Suntest CPS+ manufactured by ATLAS Co., Ltd. by irradiating the recording surface side of the optical recording medium with a xenon lamp upto color fading equivalent to the fifth class of the blue scale (JIS standard). As being clear from FIG. 11, it can be understood that amount of jitter change before and after the lamp irradiation for additive amount of the inactivator becomes as small as around 2 to 3% if the additive amount is 0.05 or more. Consequently, it is preferable for the additive amount of the inactivator to be selected for both of the first recording layer and the second recording layer in the following ranges:

$$0.05 \leq W5/(W1+W2+W5) \leq 0.30$$

$$0.05 \leq W5/(W3+W4+W5) \leq 0.30$$

It should be noted that the weight ratio of the dye material decreases relatively by adding the inactivator, so that there is a tendency that the jitter bottom value rises and the degree of modulation decreases. In order to suppress such influence to be low, the added amount of the inactivator is as small as possible, so that it is desirable to select the weight ratio of the inactivator as follows:

$$0.05 \leq W5/(W1+W2+W5) \leq 0.20$$

$$0.05 \leq W5/(W3+W4+W5) \leq 0.20$$

Figure 12:
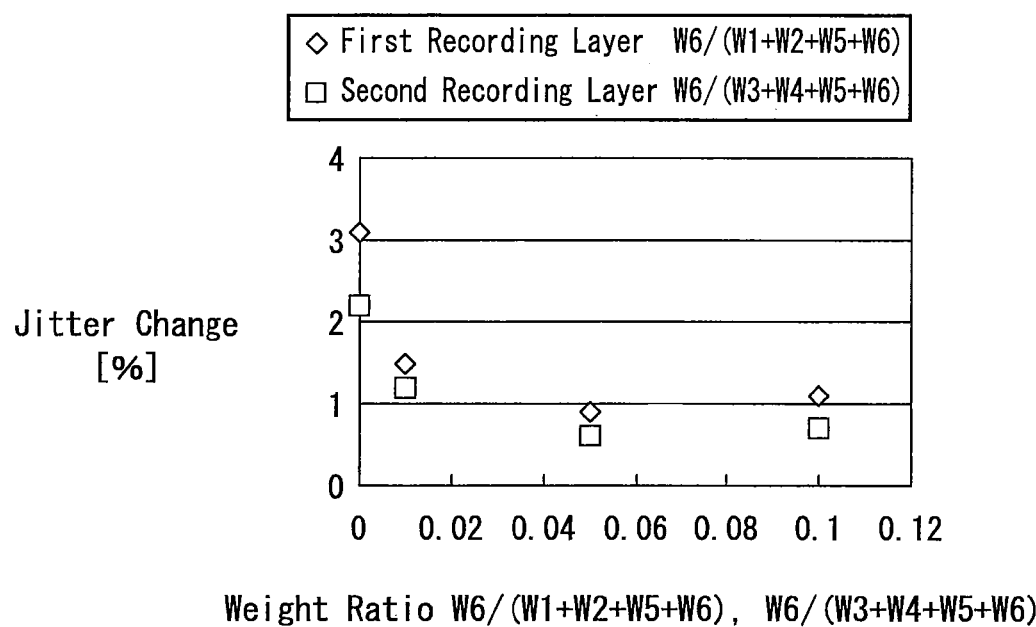
FIG. 12 is a diagram showing a relationship between weight ratio of phthalocyanine dye and jitter change in a recording layer of an optical recording medium according to an embodiment of the present invention.

Further, in order to suppress the deterioration caused by light, improvement in the light resistance of the recording signal was attempted by substituting a part of the inactivator IRG022 mentioned above by phthalocyanine dye. The phthalocyanine dye is typically stable for light, so that it is expected to stabilize the boundary portion between the data recorded portion and the data unrecorded portion for light. For the optical recording medium used in the study mentioned below, for example, Ultra Green MX (brand name) manufactured by Ciba Specialty Chemicals K.K. which is widely used as a recording film material for CD-R having correspondence to high speed recording was used. With respect to the compounding ratio of the recording film materials, the first recording layer is formed of a material including organic dyes shown in general formulas expressed by the chemical formula 1 and chemical formula 2 (weight of each organic dye is W1, W2), the second recording layer is formed of a material including organic dyes shown in general formulas expressed by the chemical formula 3 and chemical formula 4 (weight of each organic dye is W3, W4), and the composition ratios thereof are respectively made to be W2/(W1+W2)=0.6 for the first recording layer and to be W4/(W3+W4)=0.4 for the second recording layer. Further, when the weight of the inactivator is W5, the weight ratio thereof is made to be W5/(W1+W2+W5)=0.13 for the first recording layer and to be W5/(W3+W4+W5)=0.13 for the second recording layer and then, an optical recording medium was prepared for these by adding Ultra Green MX (brand name) as phthalocyanine dye and by changing the weight ratio thereof. Also in this case, light resistance testing was carried out under the Suntest CPS+ manufactured by ATLAS Co., Ltd. by irradiating the recording surface side of the optical recording medium with a xenon lamp up to color fading equivalent to the fifth class of the blue scale (JIS standard). As a result thereof, it can be understood, as shown in FIG. 12, that it is possible by adding phthalocyanine dye 0.01 or more by the weight ratio to suppress the jitter change to be 2% or less. Consequently, it can be understood that it is desirable to select the additive amount of the phthalocyanine dye for both of the first recording layer and the second recording layer in the following ranges:

$$0.01 \leq W6/(W1+W2+W5+W6) \leq 0.10$$

$$0.01 \leq W6/(W3+W4+W5+W6) \leq 0.10$$

In the above study example, Ultra Green MX (brand name) mentioned above was used as the phthalocyanine dye, but the present inventors confirmed that similar effects can be obtained also by using another phthalocyanine which is stable for light.

It should be noted that similar to inactivator, in case of adding phthalocyanine dye, the weight ratio of the dye material decreases relatively, so that there is tendency that the jitter bottom value rises and the degree of modulation decreases. In order to suppress this influence to be low, it is preferable that the additive amount of the phthalocyanine dye is also as small as possible, so that it is desirable to select the weight ratio of the phthalocyanine dye as follows:

$$0.01 \leq W6/(W1+W2+W5+W6) \leq 0.07$$

$$0.01 \leq W6/(W3+W4+W5+W6) \leq 0.07$$

Next, optical density (OD) corresponding to the film thickness of the recording layer was studied. In the example mentioned below, the first recording layer is formed of a material including organic dyes shown in general formulas expressed by the chemical formula 1 and chemical formula 2 (weight of each organic dye is W1, W2), the second recording layer is formed of a material including organic dyes shown in general formulas expressed by the chemical formula 3 and chemical formula 4 (weight of each organic dye is W3, W4) and, IRG022 manufactured by Nippon Kayaku Co., Ltd. is used as inactivator (weight is W5), and Ultra Green MX (brand name) manufactured by Ciba Specialty Chemicals K.K. is added as the phthalocyanine dye (weight is W6) respectively so as to accomplish the structure. The composition ratios of the respective materials mentioned above are made to be as follows respectively in the first recording layer:

$$W2/(W1+W2)=0.6$$

$$W5/(W1+W2+W5)=0.13$$

$$W6/(W1+W2+W5+W6)=0.03$$

in the second recording layer:

$$W4/(W3+W4)=0.4$$

$$W5/(W3+W4+W5)=0.13$$

$$W6/(W3+W4+W5+W6)=0.03$$

Figure 13:
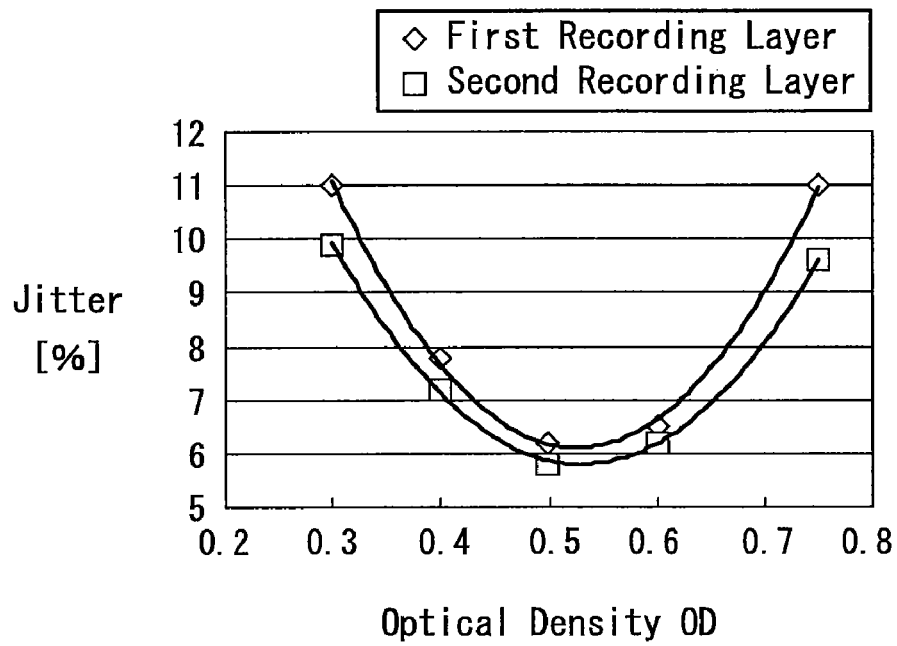
FIG. 13 is a diagram showing a relationship between optical density and jitter of a recording layer of an optical recording medium according to an embodiment of the present invention.

The optical density OD in each of the first recording layer and the second recording layer was changed in the range of 0.3 to and the jitter bottom values were measured at 2.4× speed recording. FIG. 13 shows the result. It can be understood from FIG. 13 that the jitter characteristic is favorable when the optical densities OD of the first recording layer and the second recording layer are OD(L0), OD(L1) respectively by selecting the range thereof as follows:

$$0.35 \leq OD(L0) \leq 0.70$$

$$0.35 \leq OD(L1) \leq 0.70$$

It should be noted that in order to make the jitter to be 8% or less, it is desirable to make the optical density OD(L0) of the first recording layer as follows:

$$0.4 \leq OD(L0) \leq 0.65$$

Further, in order to make the jitter to be 7% or less, it is desirable to make it as follows:

$$0.45 \leq OD(L0) \leq 0.60$$

$$0.40 \leq OD(L1) \leq 0.65$$

Figure 14:
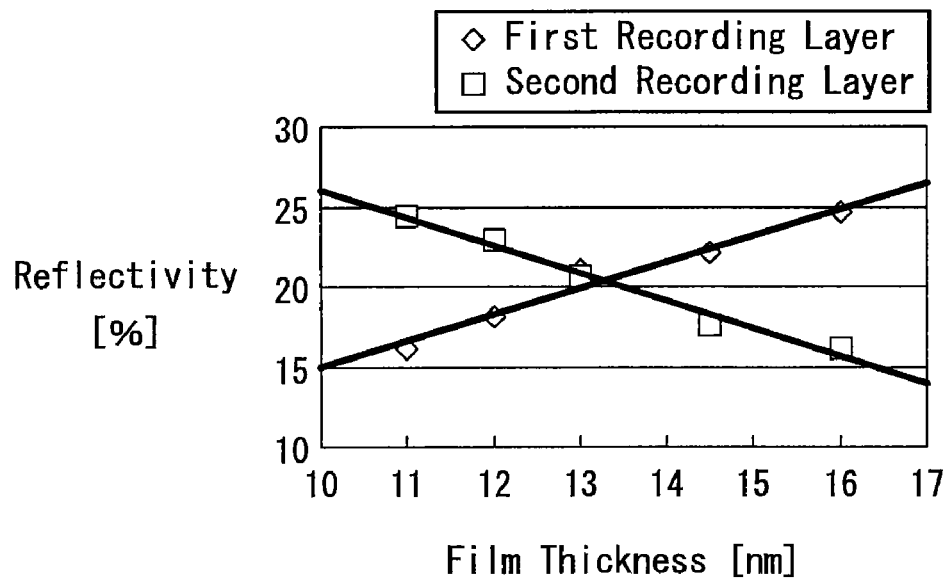
FIG. 14 is a diagram showing a relationship between film thickness and reflectivity of a semi-transparent reflective layer of an optical recording medium according to an embodiment of the present invention.

Next, in the optical recording medium fabricated by selecting composition ratios of the first and second recording layers similarly as the example in which the optical density OD is changed as mentioned above, the optical densities OD(L0), OD(L1) are both made to be 0.50 and reflectivity change for the film thickness change of the semi-transmissive reflective film was measured. In the optical recording medium having two recording layers, it is necessary for the first recording layer to have correspondence with both of the recording and the transmission, so that it becomes a considerably thin film. Consequently, a pure Ag film having a large particle system at film-making may not protect the dye film when forming a spacer layer, so that it is necessary in the present invention to use an Ag alloy having small particle diameters for the material of the semi-transmissive reflective film. It is reflectivity which receives the most influence by the film thickness of the semi-transmissive reflective film, so that reflectivity changes of the first recording layer and the second recording layer for the film thickness were evaluated respectively. FIG. 14 shows the result. Reflectivity that DVD+R DL standard should satisfy is 16% or more, and therefore, it can be understood that it is desirable to form the semi-transmissive reflective film with an Ag alloy and to make the film thickness T thereof to be as follows:

$$11 \text{ nm} \leq T \leq 16 \text{ nm}$$

As explained above, according to the present invention, it is possible in the optical recording medium of a single layer type using cyanine-based dyes and in the optical recording medium of a two-layer recording type manufactured by a 2P method to obtain signal characteristics which satisfy the standards of write-once single layer DVD, write-once two-layer DVD adequately in a wide range of recording speed such as from 1× speed to 8× speed of the DVD standard respectively and, it is possible to propose a practical optical recording medium which has no problem of durability in saving recorded information particularly in the second recording layer.

Next, an example in which the present invention is applied to an optical recording medium manufactured by an inverted stack method will be explained.

Figure 15:
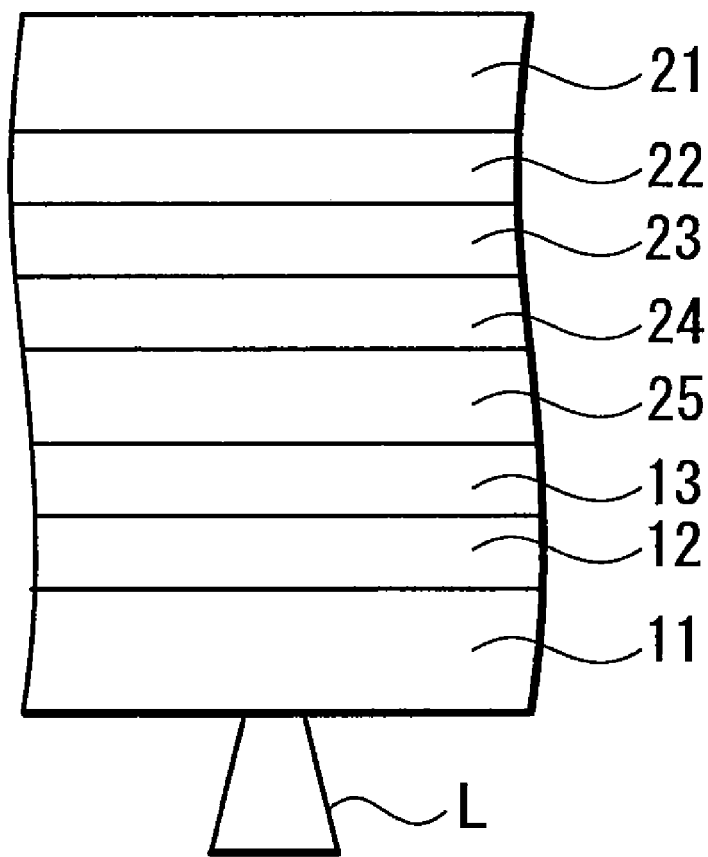
FIG. 15 is a schematic cross-sectional diagram of an optical recording medium according to an embodiment of the present invention.

FIG. 15 shows a schematic cross-sectional diagram of an embodiment in which the present invention is applied to an optical recording medium by an inverted stack method. In this example, a structure is employed in which on an optically-transparent first substrate 11 formed of PC (polycarbonate) or the like are stacked a first recording layer 12 including organic dye, a semi-transmissive reflective layer 13 formed of silver alloy or the like, an optically-transparent material portion 25 formed of UV (ultraviolet) curing resin or the like, a dielectric layer 24, a second recording layer 23 including organic dye, a reflective layer 22 formed of silver alloy or the like, and a second substrate 21. Such an optical recording medium is irradiated with light L for recording or reproduction from the substrate 11 side and recording or reproduction is carried out.

It should be noted that the optically-transparent material portion 25 in this optical recording medium only needs to be formed of a material passing through light in the range of wavelength for recording and reproduction with necessary permeability and, for example, it is allowed to employ a structure in which a dielectric layer and a UV curing resin are stacked. In this case, a dielectric layer having necessary optical-transparency is made to intervene between the semi-transmissive reflective layer 3 and the optically-transparent material portion 25 or as mentioned later, it is allowed to employ a structure in which there is no dielectric layer 24 intervening between the second recording layer 24 and the optically-transparent material portion 25. In the case of employing a structure in which the dielectric layer is made to intervene, it is possible to suppress influence on the recording layer by the optically-transparent material portion and to improve durability, similarly to a case of the optical recording medium manufactured by the 2P method mentioned above.

An embodiment of a method of manufacturing the optical recording medium will be explained with reference to manufacturing process diagrams of FIGS. 16A to 16C and FIG. 17.

Figure 16A:
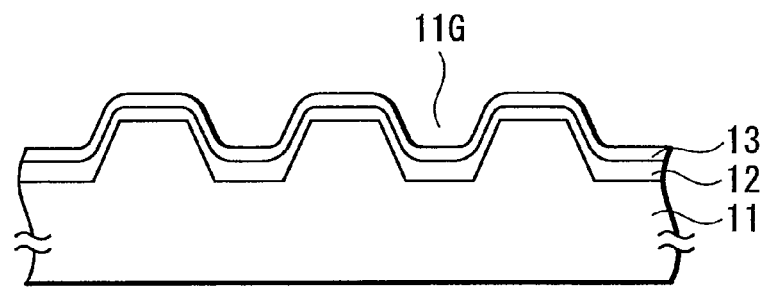
FIGS. 16A to 16C are schematic manufacturing process diagrams of a method of manufacturing an optical recording medium according to an embodiment of the present invention.

As shown in FIG. 16A, first, there is prepared the optically-transparent first substrate 11 having grooves 11G of a predetermined track pitch and depth and being formed of PC or the like. The first substrate 11 is manufactured, for example, by injection molding or the like. Then, the first recording layer 12 is applied by a spin-coat method or the like and further, the semi-transparent reflective layer 13 is stacked by a sputtering method.

Figure 16B:
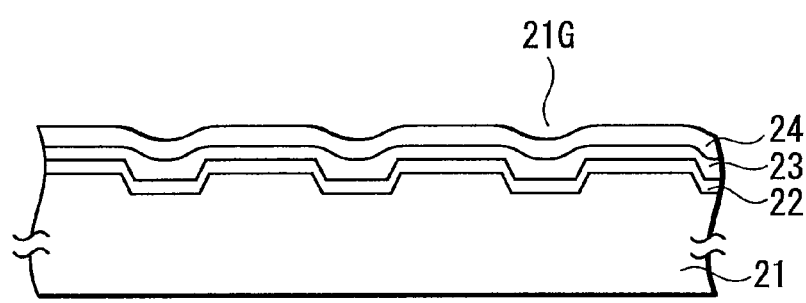

Then, as shown in FIG. 16B, a second substrate 21 provided separately from the first substrate 11 is prepared. There are formed on this second substrate 21 with grooves 21G which have reverse polarity to the grooves 11G formed on the first substrate 11 mentioned above and which are formed beforehand by injection molding or the like. Then, a reflective layer 22 is formed on the second substrate 21 by a sputtering method, a second recording layer 23 is formed thereon by a spin-coat method or the like and further, a dielectric layer 24 is formed thereon as a protective layer.

More specifically, in this case, as being clear from FIG. 16B, the reflective layer 22 is first formed on the grooves 21G by a physical film-formation method of a sputtering method or the like, so that the reflective layer 22 is formed with a concave and convex shape along the concave and convex shape of the grooves 21G. On the other hand, in the case of the 2P method mentioned above, the second recording layer is formed of a liquid material including organic dye, and a reflective layer is formed on the second recording layer formed by coating or the like and therefore, the reflective layer is formed, similarly to the second recording layer, with a shape more smooth than the concave and convex shape of the grooves.

Figure 16C:
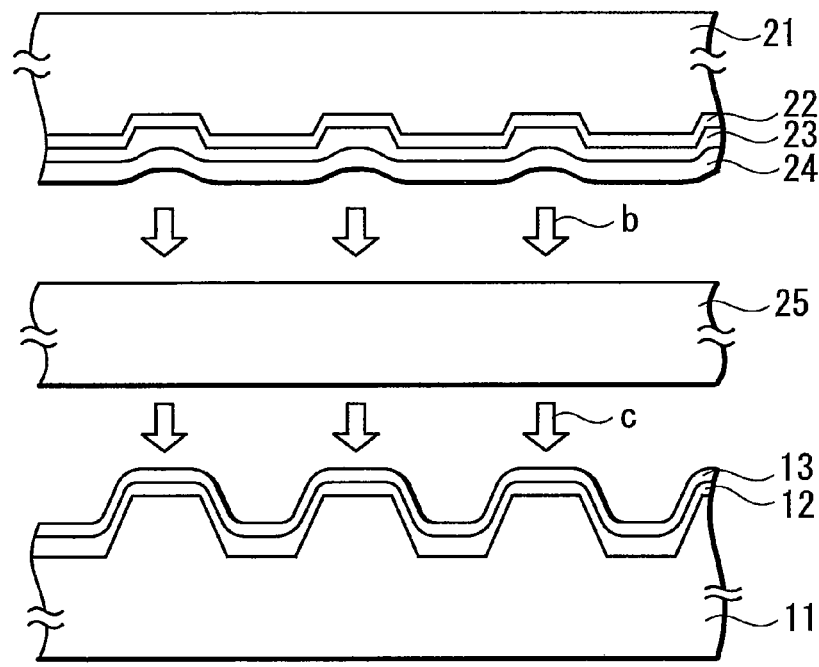
Figure 17:
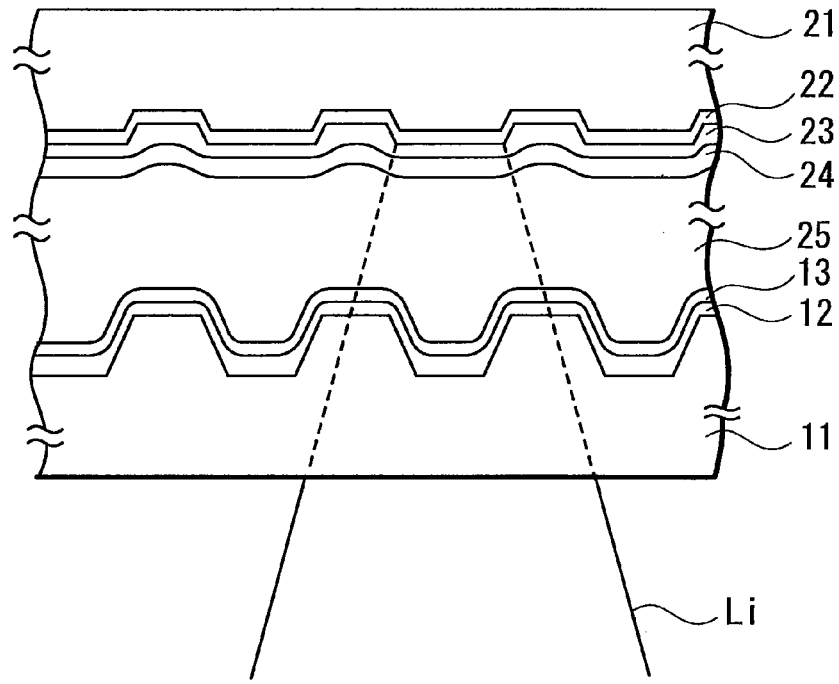
FIG. 17 is one manufacturing process diagram of a method of manufacturing an optical recording medium according to an embodiment of the present invention.

Then, as shown in FIG. 16C, in a state in which the substrates 11 and 21 formed with the first and the second recording layers 12 and 23 are placed with the semi-transparent reflective layer 13 and the dielectric layer 24 on the second recording layer 23 being faced, both the substrates are joined in the direction as shown by arrows b and c through an optically-transparent material portion 25 of UV curing resin or the like; the optically-transparent material portion 25 is hardened, for example, by ultraviolet irradiation; the first and second substrates 11 and 21 are bonded, and then, as shown in FIG. 17, it is possible to manufacture an optical recording medium having a structure of two recording layers according to the inverted stack method. In this case, light Li for recording or reproduction enters from the first substrate 11 side and recording or reproduction is carried out. Further, the optically-transparent material portion 25 becomes a spacer layer.

It should be noted in this case that the dielectric layer 24 is provided so that the second recording layer 23 and the liquid UV resin or the like would not be mixed in a case in which, for example, UV resin is used as an optically-transparent material portion 25, and in case of using, for example, sheet-shaped UV curing resin or the like as the optically-transparent material portion 25, there is no fear of mixture with the second recording layer 12, so that there is no need to form the dielectric layer. In that case, in a state of the semi-transparent reflective layer 13 facing the second recording layer 23, it is possible to obtain an optical recording medium by joining them through the solid optically-transparent material portion 25 of sheet-shape or the like.

Next, a result of studying characteristics of an optical recording medium having a structure of the present invention manufactured by such a manufacturing method will be explained.

In the example mentioned below, a substrate formed of PC having the thickness of 0.575 mm was prepared as the first substrate 11, the first recording layer 12 of a material mentioned later was formed thereon, and the semi-transparent reflective layer 13 of silver alloy was stacked thereon by a sputtering method. Next, the reflective layer 22 formed of Ag alloy was formed by a sputtering method on the second substrate 21 formed with the grooves 21G for the second recording layer having reverse polarity to the grooves 11G of the first substrate 11, and thereafter, the second recording layer formed of a material mentioned later was applied and formed using a spin-coat method and further, a dielectric layer of the thickness of 10 nm formed of ZnS-based material by a sputtering method was stacked as a protective film, for example. Thereafter, these first and second substrates 11 and 21 was hardened, for example, by UV irradiation and bonded together through an optically-transparent material portion or a spacer layer having the thickness of 50 μm, and an optical recording medium was fabricated.

For the coating liquid used in the coating process of the first and the second recording layers 12 and 23 mentioned above, liquid made by dissolving organic dye into tetrafluoropropanol (TFP) which becomes coating solvent was used. There were used respectively as organic dyes used for the materials of the recording layer with dye having a structural formula expressed by the chemical formula 5, for example, in the general formula expressed by the chemical formula 1, with dye having a structural formula expressed by the chemical formula 6, for example, in the general formula expressed by the chemical formula 2, with dye having a structural formula expressed by the chemical formula 7, for example, in the general formula expressed by the chemical formula 3 and further, with dye having a structural formula expressed by the chemical formula 8, for example, in the general formula expressed by the chemical formula 4. Also, IRG022 (brand name) manufactured by Nippon Kayaku Co., Ltd. was used as an example of the inactivator and with respect to the phthalocyanine dye, Ultra Green MX (brand name) which is manufactured by Ciba Specialty Chemicals K.K. and widely used for a recording film of CD-R at high speed recording was used as an example.

The optical density OD(L0), OD(L1) of the first and second recording layers were defined as OD=−log(T) when permeability in the maximum wavelength $\lambda$max of absorption is made to be T and both of them were 0.50. The first substrate 11 used has a shape shown in the schematic cross-sectional diagram of FIG. 18 and, for example, the track pitch Tp was 0.74 μm and groove depth D(L0) and width Wg(L0) of the groove 11G were 160 nm, 220 nm respectively. The groove width Wg(L0) of the groove is defined as width of the base of the groove portion having inclined side surface. Also, the groove 21G for the second recording layer 23 formed on the second substrate 21 has a shape shown in the schematic cross-sectional diagram of FIG. 19 and, for example, the track pitch Tp was 0.74 μm and the groove depth D(L1) and the width Wg(L1) of the groove 21G were 25 nm, 370 nm respectively. In this case, the substrate 21 side is stacked on the substrate 11 by reversing upside down, so that it will have a pattern of a reversed polarity in which concavity and convexity are inverted and width Wg(L1) of the groove 21G which becomes a recording track is defined as width on the upper side of the convex portion.

Figure 18:
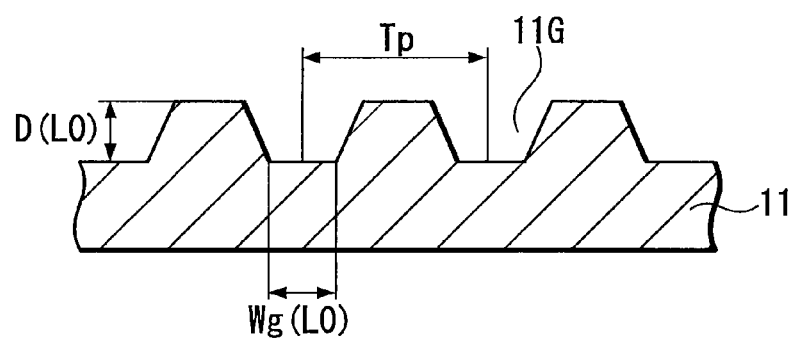
FIG. 18 is a schematic cross-sectional diagram of a main portion of an optical recording medium according to an embodiment of the present invention.
Figure 19:
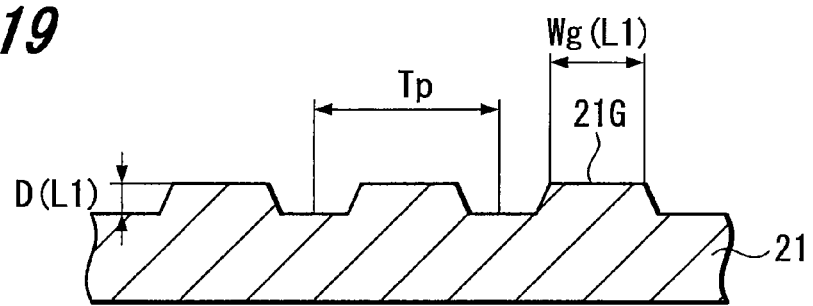
FIG. 19 is a schematic cross-sectional diagram of a main portion of an optical recording medium according to an embodiment of the present invention.

It should be noted as being clear from FIG. 18 and FIG. 19 that the depth of the groove 21G provided at the second substrate 21 is selected to be shallower than the groove 11G provided at the first substrate 11.

This is caused by the reason mentioned below. The second substrate 21 is joined onto the first substrate by inverting upside down as mentioned above, so that the recording tracks become convex portions of the grooves 21G. Accordingly, when the liquid organic dye material is formed on the groove 21G by coating or the like, it may be difficult to secure the thickness of the organic dye material at the convex portion unless this groove depth is comparatively shallow, and favorable recording and reproducing characteristics may not be obtained.

Here, the groove depth of the groove 21G is selected to be around 25 nm as an example.

ODU-1000 manufactured by Pulstec Industrial Co., Ltd. was used for signal recording and reproduction with respect to the optical recording medium having a structure mentioned above. The wavelength of the laser light of this evaluation machine was 650 nm, NA was 0.65, and the jitter value of the reproduction signal was measured by recording EFM plus signals used in DVD at random. The recording is carried out under the condition of 2.4× recording speed (linear velocity is 9.2 m/s) by using Pulse Strategy of DVD+R DL and the jitter value for the recording power when carrying out reproduction at 1× speed was measured. The second recording layer was recorded after recording the first recording layer. The jitter value shows fluctuation of recorded marks and spaces in the time axis upon reproduction, so that it becomes an index showing accuracy of the recorded mark and the space, and it means that the smaller the jitter value is, the higher the signal quality is. The following Table 3 shows the jitter values at 2.4× speed recording at the optimum recording power.

TABLE 3

|  | First Recording Layer | Second Recording Layer |
| --- | --- | --- |
| Jitter [%] | 6.2 | 5.6 |

In Table 3, the weight ratio of each material in each recording layer was fabricated in the condition mentioned below, where W1 is the weight of the organic dye expressed by the chemical formula 1, that is, the organic dye expressed by the chemical formula 5 in this example; W2 is the weight of the organic dye expressed by the chemical formula 2, that is, the organic dye expressed by the chemical formula 6 in this example, W3 is the weight of the organic dye expressed by the chemical formula 3, that is, the organic dye expressed by the chemical formula 7 in this example; W4 is the weight of the organic dye expressed by the chemical formula 4, that is, the organic dye expressed by the chemical formula 8 in this example; W5 is the weight of the inactivator, and W6 is the weight of the phthalocyanine dye.

More specifically, in this case, the weight ratios of the materials for the first recording layer 12 are made to be as follows:

$$W2/(W1+W2)=0.6$$

$$W5/(W1+W2+W5)=0.12$$

$$W6/(W1+W2+W5+W6)=0.03$$

The weight ratios of the materials for the second recording layer are made to be as follows:

$$W4/(W3+W4)=0.4$$

$$W5/(W3+W4+W5)=0.12$$

$$W6/(W3+W4+W5+W6)=0.03$$

According to the standard of DVD+R DL, the upper limit value of the jitter in the optimum recording power is 9%, and therefore, it can be understood that both of the first and second recording layers of the optical recording medium according to this embodiment have favorable jitter characteristics as two-layer write-once DVD media.

It should be noted as mentioned above that it becomes necessary to make the groove depth of the second substrate to be comparatively shallow in case of the inverted stack method, but in the example mentioned above, in the case of constituting the optical recording medium by making the groove depth of the second substrate to be 160 nm similarly to that of the first substrate, the jitter becomes 20% and it is not possible to secure the film thickness of the recording layer at the convex portion on the second substrate, which becomes a recording track and it can be understood that practical recording and reproducing characteristics may not be obtained.

Figure 20:
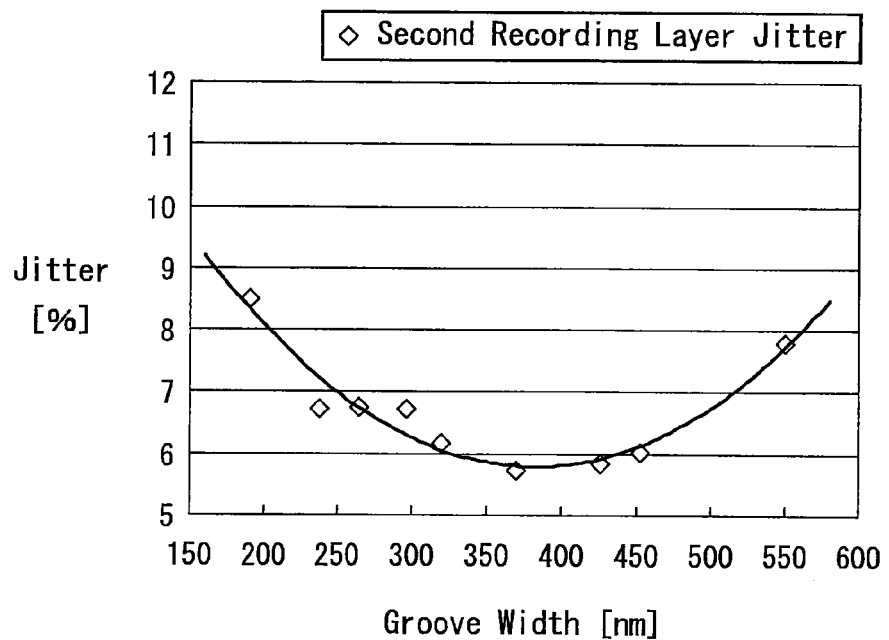
FIG. 20 is a diagram showing a relationship between groove width and jitter of an optical recording medium according to an embodiment of the present invention.

Next, the groove width Wg(L1) of the second recording layer was studied. The groove width Wg(L1) of the second recording layer was studied using a recording layer having a composition similar to the aforementioned first and second recording layers and by making the groove depth of the groove of the second recording layer to be D(L1)=25 nm. The recording is carried out under the condition at 2.4× speed and jitter values were plotted for the optimum recording powers for respective widths. FIG. 20 shows the result. It can be understood from FIG. 20 that the condition of the groove width Wg(L1) with which the jitter below 9% can be obtained is as follows and it is possible to obtain favorable jitter characteristics by selecting the range thereof:

$$190\ nm \leq Wg(L1) \leq 550\ nm$$

Furthermore, it can be said that it is desirable to select the range as follows in order to suppress the jitter within 8%:

$$200\ nm \leq Wg(L1) \leq 550\ nm$$

and it is more desirable to select the range as follows in order to suppress the jitter within 7%:

$$250\ nm \leq Wg(L1) \leq 500\ nm$$

Figure 21:
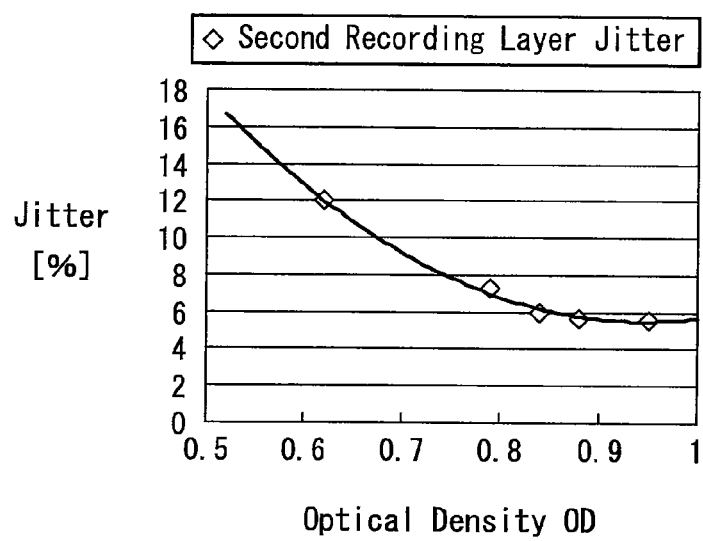
FIG. 21 is a diagram showing a relationship between optical density and jitter of a recording layer of an optical recording medium according to an embodiment of the present invention.

Next, the optical density (OD) corresponding to the film thickness of the recording film was studied. In the example below, the compounding ratios of the dyes of the first recording layer and the second recording layer were made to be composition ratios similar to those of the example explained in Table 3, the optical density OD(L1) of the second recording layer was changed in the range of 0.62 to 0.95, and jitter values at 2.4× speed recording were plotted. FIG. 21 shows the result. It can be understood from FIG. 21 that it is possible to obtain favorable jitter characteristics when selecting the range of the optical density OD(L1) as follows in which jitter below 9% can be obtained:

$$0.7 \leq OD(L1) < 1.0$$

Also, in order to make the jitter to be within 8%, it is desirable to select the range as follows:

$$0.75 \leq OD(L1) < 1.0$$

Further, in order to make the jitter to be within 7%, it is more desirable to select the range as follows:

$$0.8 \leq OD(L1) < 1.0$$

As explained above, it can be understood according to the present invention that it is possible, in the optical recording medium of two-layer recording type manufactured by an inverted stack method using cyanine-based dyes, to obtain signal characteristics which satisfy the standards of write-once single layer DVD, write-once two-layer DVD adequately over wide-ranging recording speeds such as from 1× speed to 8× speed of the DVD standard respectively. Also, in this case, it was confirmed similarly to the optical recording medium manufactured by the 2P method that durability in saving the recorded information can be secured in the second recording layer.

It should be noted that the optical recording medium according to the present invention is not limited to respective embodiments mentioned above, and it is possible, for the optical recording medium having a structure of the present invention in which the recording layer is made to be a single layer, to obtain similar effects also in a case in which the present invention is applied to an optical recording medium based on or approximately based on the DVD+R standard or is applied to an optical recording medium based on or approximately based on the DVR-R standard.

Also, it is possible, for the optical recording medium having a structure of the present invention in which the recording layer is made to have two layers, to obtain similar effects also in a case in which the present invention is applied to an optical recording medium based on or approximately based on the DVR-R DL standard or is applied to an optical recording medium based on or approximately based on the DVR-R DL standard.

Numerical values including wavelength for recording and reproduction, numerical aperture of focusing lens, 1× speed linear velocity, shortest mark length and tolerance of track pitch; and further, numerical values including thickness of substrate or first substrate when refraction factor is 1.58, thickness of protective layer or second substrate, and tolerance of thickness of spacer layer (optically-transparent material layer or optically-transparent material portion) according to respective standards of DVD+R and DVD+R DL optical recording media and DVR-R and DVR-R DL optical recording media are shown in the following Table 4 and Table 5.

TABLE 4

|  | DVD + R | DVD + R DL |
| --- | --- | --- |
| Wavelength [nm] | 655 + 10/−5 | 655 + 10/−5 |
| Numerical Aperture | 0.65 ± 0.01 | 0.65 ± 0.01 |
| Line Velocity of x1 Speed [m/s] | 3.49 ± 0.03 | 3.83 ± 0.03 |
| Shortest Mark Length [μm] | 0.40 ± 0.003 | 0.44 ± 0.003 |
| Track Pitch [μm] | 0.74 ± 0.03 | 0.74 ± 0.03 |
| Width of Substrate or 1st Substrate [μm] | 600 ± 20 | ≧562 |
| Width of Protective Layer or 2nd Substrate [μm] | — | ≦632 |
| Spacer Layer [μm] | — | 55 + 15/−10 |

TABLE 5

|  | DVD-R | DVD-R DL |
| --- | --- | --- |
| Reproduction Wavelength [nm] | 650 ± 5 | 650 ± 5 |
| Recording Wavelength [nm] | 650 + 10/−5 | 650 + 10/−5 |
| Numerical Aperture | 0.60 ± 0.01 | 0.60 ± 0.01 |
| Line Velocity of x1 Speed [m/s] | 3.49 ± 0.03 | 3.83 ± 0.03 |
| Shortest Mark Length [μm] | 0.40 ± 0.003 | 0.44 ± 0.003 |
| Track Pitch [μm] | 0.74 ± 0.03 | 0.74 ± 0.03 |
| Width of Substrate or 1st Substrate [μm] | 600 ± 30 | ≧562 |
| Width of Protective Layer or 2nd Substrate [μm] | — | ≦632 |
| Spacer Layer [μm] | — | 55 + 15/−10 |

It should be noted in Table 4 and Table 5 that 655 nm+10 nm/−5 nm of light wavelength for recording and reproduction of DVD+R and DVD+R DL means that tolerance is +10 nm and −5 nm and similarly, 650 nm+10 nm/−5 nm of light wavelength for recording of DVR-R and DVR-R DL means that tolerance is +10 nm and −5 nm.

Also, the optical recording medium and the method of manufacturing the same according to the present invention are not limited to the optical recording mediums explained in the respective embodiments mentioned above and it should be appreciated that it is possible to apply various modifications and changes to material structures or the like of, for example, a substrate, a protective layer and a dielectric layer other than a recording layer, in a scope without departing from the configuration of the present invention.

According to the optical recording medium and method of manufacturing the same of the present invention, it is possible to secure favorable recording and reproducing characteristics and reliability in saving recorded information in the optical recording medium in which organic dye is used for a recording layer.

In particular, it is possible to secure favorable recording and reproducing characteristics and reliability in saving recorded information in the second recording layer in the optical recording medium in which the recording layer has a two-layer structure by constituting the second recording layer with materials having organic dyes shown in general formulas expressed by the chemical formula 3 and chemical formula 4.

DESCRIPTION OF REFERENCE NUMERALS

1 . . . first substrate, 1G . . . groove, 2 . . . first recording layer, 3 . . . semi-transmissive reflective layer, 4 . . . optically-transparent material layer, 4G . . . groove, 5 . . . stamper, 6 . . . second recording layer, 7 . . . reflective layer, 8 . . . protective layer, 11 . . . first substrate, 11G . . . groove, 12 . . . first recording layer, 13 . . . semi-transmissive reflective layer, 21 . . . second substrate, 21G . . . groove, 22 . . . reflective layer, 23 . . . second recording layer, 24 . . . dielectric layer, 25 . . . optically-transparent material portion, 31 . . . substrate, 32 . . . recording layer, 33 . . . reflective layer, 34 . . . protective layer It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An optical recording medium comprising:
a first recording layer;
a semi-transmissive reflective layer;
an optically-transparent material layer; and
a second recording layer and a reflective layer formed on an optically-transparent substrate,
wherein the first recording layer includes an organic dye shown by a general formula expressed by a chemical formula 1 below (in chemical formula 1, R1 is an alkyl group of carbon number 1 to 4; R2, R3 respectively are alkyl groups of carbon number 1 to 4, benzyl groups or groups forming 3 to 6 membered rings by being coupled; Y1, Y2 respectively are organic groups independently; and X is $ClO_4$, $BF_4$, $PF_6$, $SbF_6$) and an organic dye shown by a general formula expressed by a chemical formula 2 below (in chemical formula 2, R1, R4 are alkyl groups of carbon number 1 to 4; R2, R3 respectively are alkyl groups of carbon number 1 to 4, benzyl groups or groups forming 3 to 6 membered rings by being coupled; Y1, Y2 respectively are organic groups independently; and X is $ClO_4$, $BF_4$, $PF_6$, $SbF_6$), or the first recording layer includes an organic dye shown by a general formula expressed by a chemical formula 3 below (in chemical formula 3, R1, R2 are alkyl groups of carbon number 1 to 4; Y1, Y2 respectively are organic groups independently; and X is $ClO_4$, $BF_4$, $PF_6$, $SbF_6$) and an organic dye shown by a general formula expressed by a chemical formula 4 below (in chemical formula 4, R1, R4 are alkyl groups of carbon number 1 to 4; R2, R3 are alkyl groups of carbon number 1 to 4 or groups forming 3 to 6 membered rings by being coupled; Y1, Y2 respectively are organic groups independently; and X is $ClO_4$, $BF_4$, $PF_6$, $SbF_6$), and wherein the second recording layer includes an organic dye according to the chemical formula 3 below, and an organic dye according to the chemical formula 4 below:

[chemical formula 1]

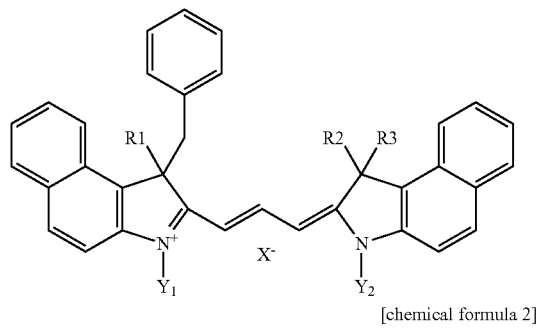

[chemical formula 2]

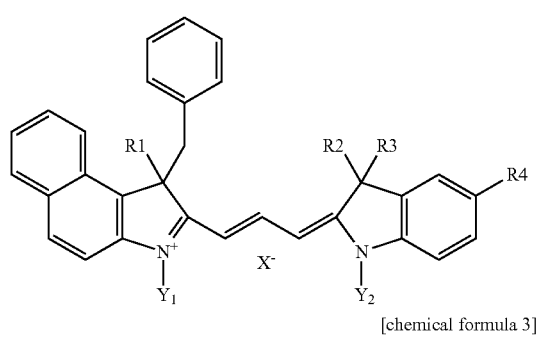

[chemical formula 3]

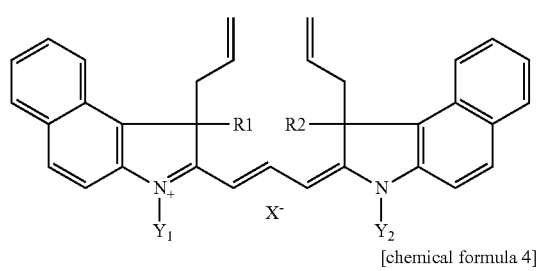

[chemical formula 4]

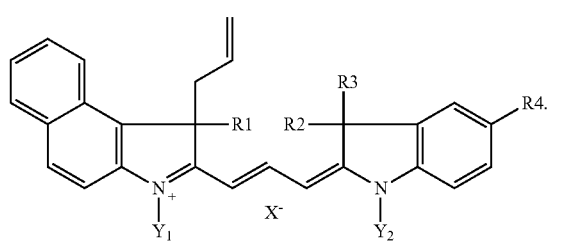

2. The optical recording medium according to claim 1, wherein a groove depth D(L0) of a groove of the first recording layer provided to the substrate satisfies 130 nm ≦D(L0) ≦190nm.

3. The optical recording medium according to claim 1, wherein a groove width Wg(L0) of a groove of the first recording layer provided to the substrate satisfies 160nm ≦Wg(L0) ≦300 nm.

4. The optical recording medium according to claim 1, wherein a groove depth D(L1) of a groove of the second recording layer provided to the optically-transparent material layer satisfies 130 nm ≦D(L1) ≦190 nm.

5. The optical recording medium according to claim 1, wherein a groove width Wg(L1) of a groove of the second recording layer provided to the optically-transparent material layer satisfies 140 nm 23 Wg (L1) ≦300 nm.

6. The optical recording medium according to claim 1, wherein the organic dye expressed by chemical formula 1 is a material having a structural formula expressed by a chemical formula 5 as follows:

[chemical formula 5]

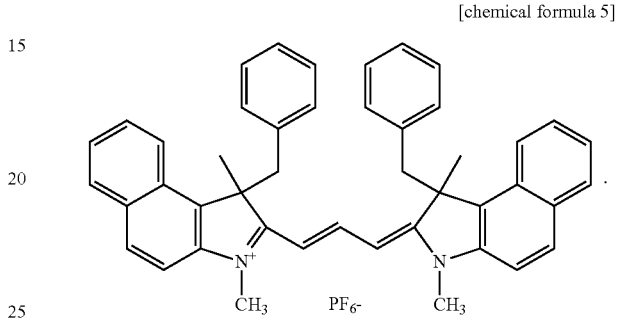

7. The optical recording medium according to claim 1, wherein the organic dye expressed by chemical formula 2 is a material having a structural formula expressed by a chemical formula 6 as follows:

[chemical formula 6]

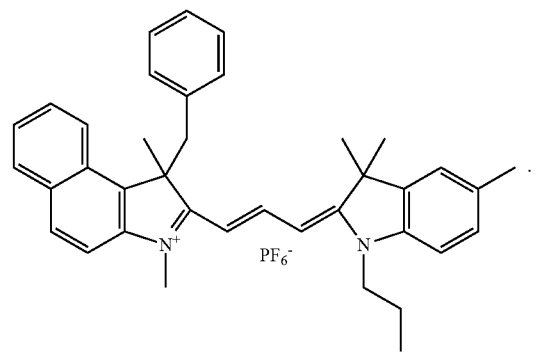

8. The optical recording medium according to claim 1, wherein the organic dye expressed by chemical formula 4 is a material having a structural formula expressed by a chemical formula 7 as follows:

[chemical formula 7]

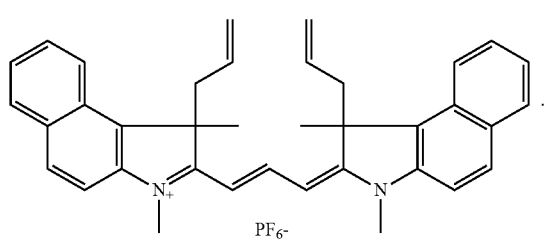

9. The optical recording medium according to claim 1, wherein the organic dye expressed by chemical formula 4 is a material having a structural formula expressed by a chemical formula 8 as follows:

[chemical formula 8]

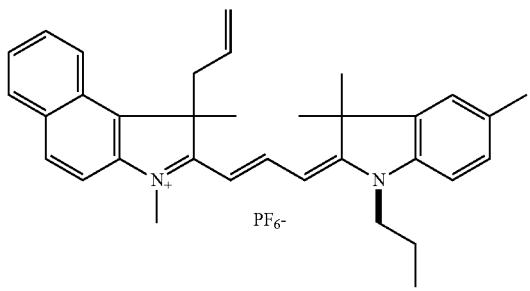

10. The optical recording medium according to claim 1,
wherein $0.5 \leq W2(W1+W2) \leq 0.9$ is satisfied, wherein W1 is the weight of the organic dye expressed by chemical formula 1, and W2 is the weight of the organic dye expressed by chemical formula 2 in the first recording layer, or
wherein $0.4 \leq W4/(W3+W4) \leq 0.8$ is satisfied, wherein W3 is the weight of the organic dye expressed by chemical formula 3, and W4 is the weight of the organic dye expressed by chemical formula 4 in the first recording layer.

11. The optical recording medium according to claim 1, wherein an inactivator is added to the first recording layer.

12. The optical recording medium according to claim 11, wherein $0.05 \leq W5/(W1+W2+W5) \leq 0.30$ is satisfied wherein W1 is the weight of the organic dye expressed by chemical formula 1, W2 is the weight of the organic dye expressed by chemical formula 2, and W5 is the weight of the inactivator in the first recording layer, or
wherein $0.05 \leq W5/(W3+W4+W5) \leq 0.30$ is satisfied wherein W3 is the weight of the organic dye expressed by chemical formula 3, W4 is the weight of the organic dye expressed by chemical formula 4, and W5 is the weight of the inactivator in the first recording layer.

13. The optical recording medium according to claim 1, wherein a phthalocyanine dye is added in the first recording layer.

14. The optical recording medium according to claim 13,
wherein $0.01 \leq W6/(W1+W2+W5+W6) \leq 0.10$ is satisfied wherein W1 is the weight of the organic dye expressed by chemical formula 1, W2 is the weight of the organic dye expressed by chemical formula 2, W5 is the weight of the inactivator in the first recording layer, and W6 is the weight of the phthalocyanine dye in the first recording layer, or
wherein $0.01 \leq W6/(W3+W4+W5+W6) \leq 0.10$ is satisfied wherein W3 is the weight of the organic dye expressed by chemical formula 3, W4 is the weight of the organic dye expressed by chemical formula 4, W5 is the weight of the inactivator in the first recording layer, and W6 is the weight of the phthalocyanine dye in the first recording layer.

15. The optical recording medium according to claim 1, wherein $0.35 \leq OD(L0) \leq 0.70$ is satisfied, and OD(L0) is the optical density in the maximum wavelength of absorption of the first recording layer.

16. The optical recording medium according to claim 1, wherein $0.1 \leq W4/(W3+W4) \leq 0.5$ is satisfied, where W3 is the weight of the organic dye expressed by chemical formula 3, and W4 is the weight of the organic dye expressed by chemical formula 4 in the second recording layer.

17. The optical recording medium according to claim 1, wherein an inactivator is added to the second recording layer.

18. The optical recording medium according to claim 17, wherein $0.05 \leq W5/(W3+W4+W5) \leq 0.30$ is satisfied, where W3 is the weight of the organic dye expressed by chemical formula 3, W4 is the weight of the organic dye expressed by chemical formula 4, and W5 is the weight of the inactivator in the second recording layer.

19. The optical recording medium according to claim 1, wherein a phthalocyanine dye is added in the second recording layer.

20. The optical recording medium according to claim 19, wherein $0.01 \leq W6/(W3+W4+W5+W6) \leq 0.10$ is satisfied, where W3 is the weight of the organic dye expressed by chemical formula 3, W4 is the weight of the organic dye expressed by chemical formula 4, W5 is the weight of the inactivator, and W6 is the weight of the phthalocyanine dye in the second recording layer.

21. The optical recording medium according to claim 1, wherein $0.35 \leq OD(L1) \leq 0.70$ is satisfied, and OD(L1) is the optical density in the maximum wavelength of absorption of the second recording layer.

22. The optical recording medium according to claim 1, wherein $11\ nm \leq T \leq 16$ is satisfied, wherein an Ag alloy is a material of the semitransparent reflective layer of the optical recording medium, and wherein T is the film thickness thereof.

23. A method of manufacturing an optical recording medium, the method comprising:
stacking at least a first recording layer and a semi-transmissive reflective layer formed on an optically-transparent substrate with a groove;
depositing a light curing material layer on the semi-transmissive reflective layer;
irradiating the light curing material layer with light and hardening the light curing material layer in a state in which a stamper formed with a groove pattern is depressed, to form an optically-transparent material layer; and
exfoliating the stamper from the optically-transparent material layer and stacking and forming at least a second recording layer and a reflective layer,
wherein the first recording layer uses a material having an organic dye shown by a general formula expressed by chemical formula 1 below (in chemical formula 1, R1 is an alkyl group of carbon number 1 to 4; R2, R3 respectively are alkyl groups of carbon number 1 to 4, benzyl groups or groups forming 3 to 6 membered rings by being coupled; Y1, Y2 respectively are organic groups independently; and X is $ClO_4$, $BF_4$, $PF_6$, $SbF_6$) and an organic dye shown by a general formula expressed by chemical formula 2 below (in chemical formula 2, R1, R4 are alkyl groups of carbon number 1 to 4; R2, R3 respectively are alkyl groups of carbon number 1 to 4, benzyl groups or groups forming 3 to 6 membered rings by being coupled; Y1, Y2 respectively are organic groups independently; and X shows $ClO_4$, $BF_4$, $PF_6$, $SbF_6$), or
wherein the first recording layer uses a material having an organic dye shown by a general formula expressed by chemical formula 3 below (in chemical formula 3, R1, R2 are alkyl groups of carbon number 1 to 4; Y1, Y2 respectively are organic groups independently; and X is $ClO_4$, $BF_4$, $PF_6$, $SbF_6$) and an organic dye shown by a general formula expressed by chemical formula 4 below (in the formula, R1, R4 are alkyl groups of carbon number 1 to 4; R2, R3 are alkyl groups of carbon number 1 to 4 or groups forming 3 to 6 membered rings by being coupled; Y1, Y2 respectively are organic groups independently; and X is $ClO_4$, $BF_4$, $PF_6$, $SbF_6$); and wherein the second recording layer uses a material having an organic dye according to chemical formula 3 and an organic dye according to chemical formula 4 below:

[chemical formula 1]

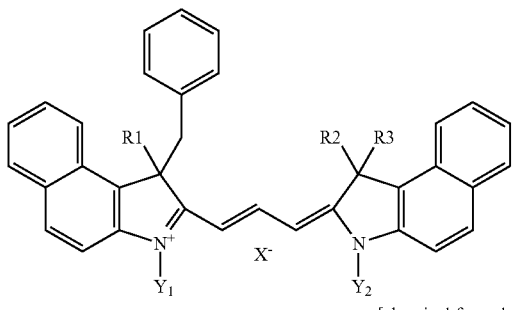

[chemical formula 2]

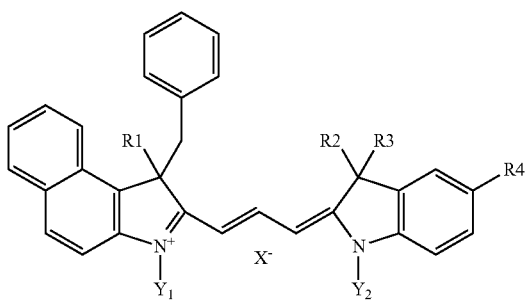

[chemical formula 3]

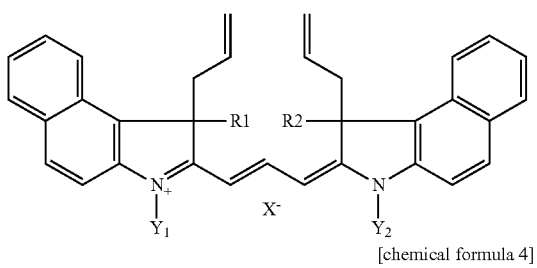

[chemical formula 4]

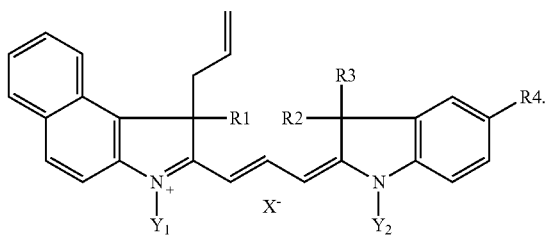

24. An optical recording medium which is formed by:
stacking at least a first recording layer and a semi-transmissive reflective layer on an optically-transparent first substrate formed with a groove;
stacking at least reflective layer and a second recording layer on a second substrate formed with a groove having reverse polarity to the groove; and
joining the semi-transmissive reflective layer side on the first substrate and the second recording layer side on the second substrate with an optically-transparent material portion in between, wherein the first recording layer includes an organic dye shown by a general formula expressed by chemical formula 1 (in chemical formula 1, R1 is an alkyl group of carbon number 1 to 4; R2, R3 respectively are alkyl groups of carbon number 1 to 4, benzyl groups or groups forming 3 to 6 membered rings by being coupled; Y1, Y2 respectively are organic groups independently; and X is $ClO_4$, $BF_4$, $PF_6$, $SbF_6$) and an organic dye shown by a general formula expressed by chemical formula 2 (in chemical formula 2, R1, R4 is alkyl groups of carbon number 1 to 4; R2, R3 respectively are alkyl groups of carbon number 1 to 4, benzyl groups or groups forming 3 to 6 membered rings by being coupled; Y1, Y2 respectively are organic groups independently; and X shows $ClO_4$, $BF_4$, $PF_6$, $SbF_6$), or wherein the first recording layer includes an organic dye shown by a general formula expressed by chemical formula 3 (in chemical formula 3, R1, R2 are alkyl groups of carbon number 1 to 4; Y1, Y2 respectively are organic groups independently; and X is $ClO_4$, $BF_4$, $PF_6$, $SbF_6$) and an organic dye shown by a general formula expressed by chemical formula 4 (in chemical formula 4, R1, R4 are alkyl groups of carbon number 1 to 4; R2, R3 are alkyl groups of-carbon number 1 to 4 or groups forming 3 to 6 membered rings by being coupled; Y1, Y2 respectively are organic groups independently; and X is $ClO_4$, $BF_4$, $PF_6$, $SbF_6$); and wherein the second recording layer includes an organic dye according to chemical formula 3 and with an organic dye according to chemical formula 4 below:

[chemical formula 1]

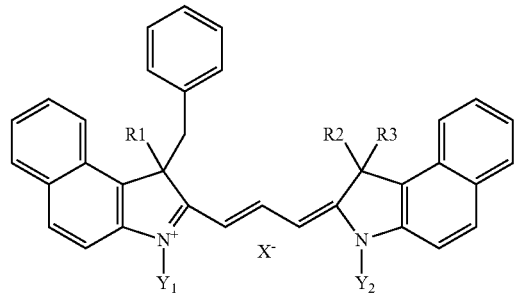

[chemical formula 2]

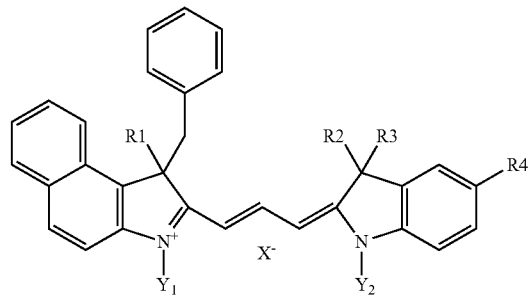

-continued

[chemical formula 3]

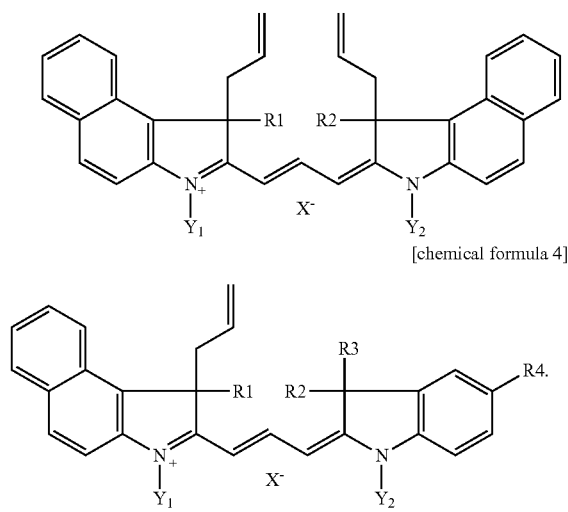

[chemical formula 4]

25. The optical recording medium according to claim 24, wherein a groove width Wg(L1) of the groove of the second recording layer provided to the optically-transparent material portion of the optical recording medium satisfies 190 nm ≦Wg(L1) nm.

26. The optical recording medium according to claim 24, wherein the organic dye expressed by chemical formula 1 is a material having a structural formula expressed by chemical formula 5 below:

[chemical formula 5]

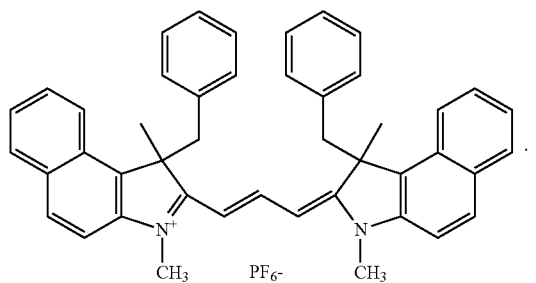

27. The optical recording medium according to claim 24, wherein the organic dye expressed by chemical formula 2 is a material having a structural formula expressed by chemical formula 6 below:

[chemical formula 6]

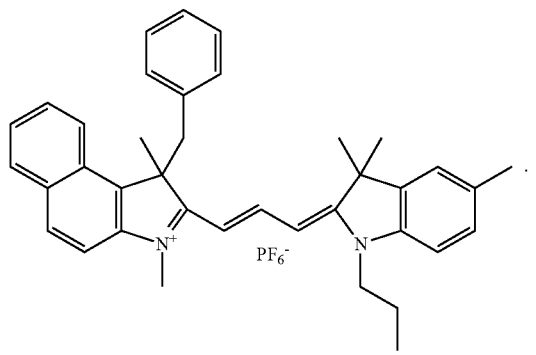

28. The optical recording medium according to claim 24, wherein the organic dye expressed by chemical formula 4 is a material having a structural formula expressed by chemical formula 7 below:

[chemical formula 7]

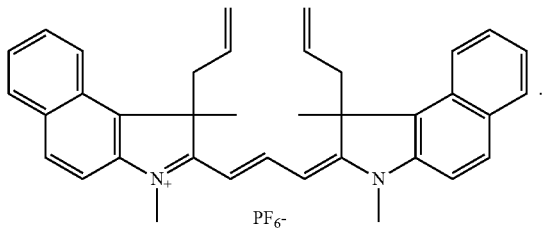

29. The optical recording medium according to claim 24, wherein the organic dye according to chemical formula 4 is a material having a structural formula expressed by chemical formula 8 below:

[chemical formula 8]

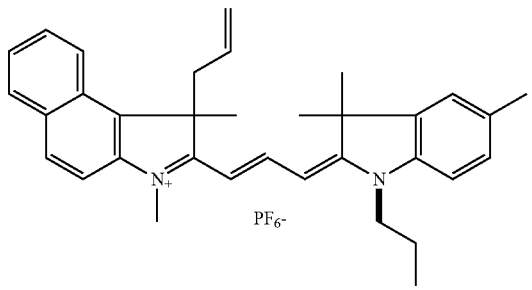

30. The optical recording medium according to claim 24, wherein an inactivator is added to the second recording layer.

31. The optical recording medium according to claim 24, wherein phthalocyanine dye is added to the second recording layer.

32. The optical recording medium according to claim 24, wherein $0.70 \leq OD(L1) < 1.0$ is satisfied, and OD(L1) is the optical density in the maximum wavelength of absorption of the second recording layer.

33. A method of manufacturing an optical recording medium, the method comprising:
   stacking at least a first recording layer and a semi transmissive reflective layer formed on an optically-transparent first substrate with a groove,
   stacking at least a reflective layer and a second recording layer formed on a second substrate with a groove having reverse polarity to the groove, and
   joining the semi-transmissive reflective layer side on the first substrate and the second recording layer side on the second substrate with an optically-transparent material portion in between,
   wherein the first recording layer includes a material having an organic dye shown by a general formula expressed by chemical formula 1 (in chemical formula 1, R1 is an alkyl group of carbon number 1 to 4; R2, R3 respectively are alkyl groups of carbon number 1 to 4, benzyl groups or groups forming 3 to 6 membered rings by being coupled; Y1, Y2 respectively are organic groups independently; and X is $ClO_4$, $BF_4$, $PF_6$, $SbF_6$) and an organic dye shown by a general formula expressed by chemical formula 2 (in chemical formula 2, R1, R4 are alkyl groups of carbon number 1 to 4; R2, R3 respectively are alkyl groups of carbon number 1 to 4, benzyl groups or groups forming 3 to 6 membered rings by being coupled; Y1, Y2 respectively are organic groups independently; and X is $ClO_4$, $BF_4$, $PF_6$, $SbF_6$), or wherein the first recording layer includes a material having an organic dye shown by a general formula expressed by chemical formula 3 (in chemical formula 3, R1 and R2 are alkyl groups of carbon number 1 to 4; Y1, Y2 respectively are organic groups independently; and X is $ClO_4$, $BF_4$, $PF_6$, $SbF_6$) and an organic dye shown by a general formula expressed by the chemical formula 4 (in the formula, R1, R4 are alkyl groups of carbon number 1 to 4; R2, R3 are alkyl groups of carbon number 1 to 4 or groups forming 3 to 6 membered rings by being coupled; Y1, Y2 respectively are organic groups independently; and X is $ClO_4$, $BF_4$, $PF_6$, $SbF_6$); and wherein the second recording layer includes a material having an organic dye according to chemical formula 3 and an organic dye according to chemical formula 4 below:

[chemical formula 1]

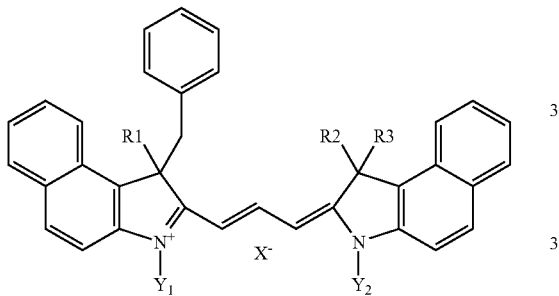

[chemical formula 2]

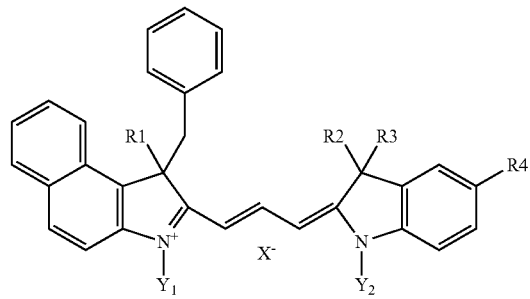

[chemical formula 3]

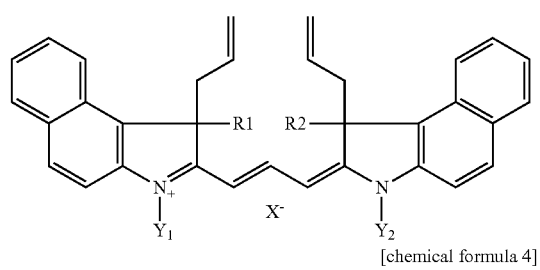

[chemical formula 4]

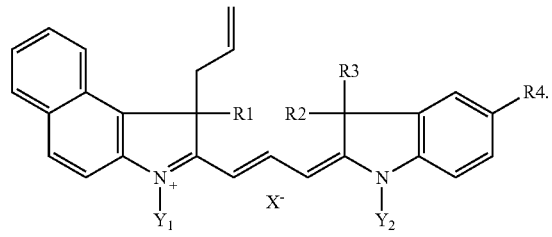

* * * * *